(12) United States Patent
Chester et al.

(10) Patent No.: US 11,825,342 B2
(45) Date of Patent: Nov. 21, 2023

(54) SYSTEMS, APPARATUSES, AND METHODS FOR REDUCING NETWORK BANDWIDTH USAGE BY ROBOTS

(71) Applicant: Brain Corporation, San Diego, CA (US)

(72) Inventors: Keith Chester, San Diego, CA (US); Daniel Sackinger, San Diego, CA (US)

(73) Assignee: Brain Corporation, San Diego, CA (US)

( * ) Notice: Subject to any disclaimer, the term of this patent is extended or adjusted under 35 U.S.C. 154(b) by 121 days.

(21) Appl. No.: 17/465,326

(22) Filed: Sep. 2, 2021

(65) Prior Publication Data
US 2022/0070730 A1    Mar. 3, 2022

Related U.S. Application Data

(60) Provisional application No. 63/073,672, filed on Sep. 2, 2020.

(51) Int. Cl.
*H04W 28/06*    (2009.01)
*H04L 47/28*    (2022.01)

(52) U.S. Cl.
CPC ........... *H04W 28/06* (2013.01); *H04L 47/286* (2013.01)

(58) Field of Classification Search
CPC ....... H04L 47/286; H04L 67/06; H04L 67/12; H04W 28/06; H04W 4/70
See application file for complete search history.

(56) References Cited

U.S. PATENT DOCUMENTS

| | | | |
|---|---|---|---|
| 2005/0080514 A1* | 4/2005 | Omote | G06N 3/008 700/253 |
| 2013/0073669 A1* | 3/2013 | Roberts | H04L 67/5683 709/214 |
| 2017/0106530 A1* | 4/2017 | Shimokawa | G05B 19/042 |

* cited by examiner

*Primary Examiner* — Zhensheng Zhang
(74) *Attorney, Agent, or Firm* — Reed Smith LLP; Sidharth Kapoor

(57) ABSTRACT

Systems, apparatuses, and methods for reducing network bandwidth usage by a fleet of robots. According to at least one non-limiting exemplary embodiment, robots coupled to a server collect and produce a substantial amount of data, only a portion of that data being useful for operators to monitor behavior of the robot. The present disclosure provides for, inter alia, optimized systems, apparatuses, and methods for operators to extract the useful data using only reduced bandwidth of cellular LTE networks or Wi-Fi networks.

18 Claims, 12 Drawing Sheets

SYSTEMS, APPARATUSES, AND METHODS FOR REDUCING NETWORK BANDWIDTH USAGE BY ROBOTS

PRIORITY

This application claims the benefit of U.S. Provisional Patent Application Ser. No. 63/073,672 filed on Sep. 2, 2020 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems, apparatuses, and methods for reducing network bandwidth usage by a robot or a plurality of robots.

SUMMARY

The foregoing needs are satisfied by the present disclosure, which provides systems, apparatuses, and methods for reducing network bandwidth usage by a robot or a plurality of robots.

Exemplary embodiments described herein have innovative features, no single one of which is indispensable or solely responsible for their desirable attributes. Without limiting the scope of the claims, some of the advantageous features will now be summarized. One skilled in the art would appreciate that, as used herein, the term robot may generally refer to an autonomous vehicle or object that travels a route, executes a task, or otherwise moves automatically upon executing or processing computer readable instructions.

According to at least one non-limiting exemplary embodiment, a method and a system comprising a non-transitory computer readable storage medium comprising a plurality of instructions thereon and at least one controller configured to execute the instructions to, issue a first communications to a server, the first communications comprising metadata associated with binary data generated by the at least one controller and sensors of the robotic system; issue a second communications to a server, the second communications comprising the at least one controller requesting if any binary data is to be uploaded to the server; and issue a third communications to the server, the third communications comprising a bundle of information, the bundle of information corresponds to binary data requested by the server in response to the server receiving the second communications. The server requests the binary data in response to a query input by an operator of the robotic system. The first, second and third communications are effectuated using cellular LTE (long term evolution) networks or Wi-Fi networks. The bundle of information communicated via the third communications includes at least in part one or more of data from a sensor of the robotic system, a computer readable map produced by the at least one controller, or actuator commands issued. The bundle of information includes binary data collected or produced or generated about a time window about an assist event, wherein the time window is specified by the query. Wherein the instructions when executed by the at least one controller, further configure the at least one controller to, assign a time to live ("TTL") to each element of binary data; and delete the binary data upon the TTL expiring; and wherein, the bundle of information does not include any binary data of which the corresponding TTL has expired. The first communications further include summary information, summary information corresponding to performance summaries of the robotic system.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
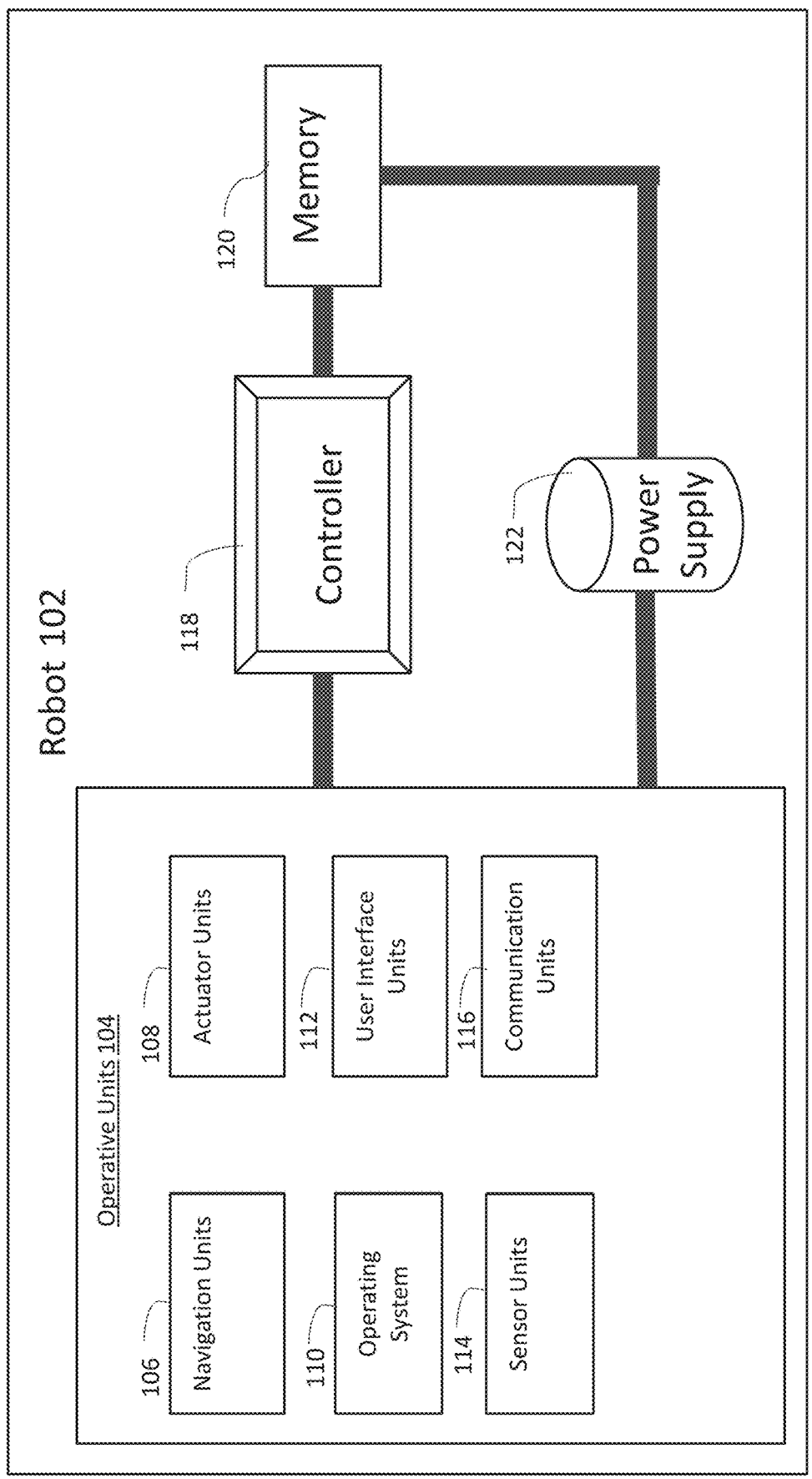
FIG. 1A is a functional block diagram of a robot in accordance with some embodiments of this disclosure.

All Figures disclosed herein are © Copyright 2021 Brain Corporation. All rights reserved.

DETAILED DESCRIPTION

Currently, many robots operate in complicated and dynamic environments, requiring real-time decision making and precise task execution. For example, many robots operate in retail environments, such as grocery stores, warehouses, and/or as delivery robots, and frequently interact with dynamic objects, such as humans, other robots, and/or inanimate objects which are moved about the environment (e.g., shopping carts). It is useful for operators and/or designers of these robots to track the performance of the robots over time, thereby requiring a means for receiving data from the robots. For a small number of robots, data may be acquired directly from the robots themselves, such as through a wired connection and/or constant upload of all data over a network. For large numbers of robots, such as hundreds, thousands, or more, collecting data via a wired transmission (e.g., via USB) becomes impractical. Accordingly, many robots use networks, such as cellular (e.g., 3G, 4G, 5G and variants thereof) and/or Wi-Fi networks.

These robots may be equipped with a plurality of sensors configured to collect data about their environments. The amount of data may be large, such as video streams from cameras or point clouds from light detection and ranging ("LiDAR") sensors, which quickly makes usage of local networks impractical for transmitting all data collected by the robots. Further, a majority of data collected by robots is only of use for a short while by the robots themselves, such as a video feed and LiDAR measurements of a robot navigating down a hallway without any incident, and is not substantially useful for robot operators to improve robotic behavior. Accordingly, there is a need in the art for pull-based telemetry and optimization of network bandwidth usage by robots to enable operators of large fleets of robots to efficiently, and cost effectively, monitor and improve robotic behavior.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems, apparatuses, and methods for reducing network bandwidth usage by a robot or fleet of robots. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, scooters, self-balancing vehicles such as those manufactured by Segway, etc.), trailer movers, vehicles, and the like. Robots may also include any autonomous and/or semi-autonomous machine for transporting items, people, animals, cargo, freight, objects, luggage, and/or anything desirable from one location to another.

As used herein, binary data may include any measurements, observations, facts, depictions, estimations, descriptions, features, and/or any other information stored in computer readable formats. Metadata, as used herein, corresponds to information which describes the binary data, such as, without limitation, a time at which the binary data are acquired, a device from which the binary data are acquired, a location where the binary data are acquired, storage lifetime of a binary data counterpart on a device (e.g., an image stored on a robot) comprising limited data storage, and/or other forms of metadata as discussed herein. By way of illustrative example, an image includes information about a visual scene and is considered binary data, whereas the device (i.e., camera) and time from which the image originates are the metadata of the image data. As another example, robots may produce maps as they navigate, the maps themselves correspond to binary data and the information corresponding to when the map is produced, which sensory inputs were used to create the map, the time to produce the map, which robot produces the map, etc. is considered metadata of the map. One skilled in the art may appreciate that metadata is substantially smaller than binary data and typically includes a few bytes of information, whereas binary data (e.g., images) may include hundreds, thousands, or millions of bytes of information. Various specific examples of binary data and metadata are disclosed below, none of which are intended to be limiting.

As used herein, an assist event corresponds to any event which impedes the ability of a robot to perform its operations autonomously. Typically, assist events require some form of human assisting the robot. For example, an assist event may occur when a path of a robot is blocked by an object, the robot collides with an object, the robot is unable to execute a maneuver (e.g., a tight turn into a narrow hallway), hardware failures (e.g., a cleaning robot running out of cleaning supplies), and/or any other event which the robot is unable to autonomously resolve by itself. Humans may assist a robot in person, e.g., by moving the robot or nearby objects, or may assist the robot from a remote location via controlling motions of the robot from the remote location. Some assist events may not require a human to assist the robot, such as assist events caused by hardware and/or software failures which may cause the robot to restart or update.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (802.16)), PAN (e.g., PAN/802.15), cellular (e.g., 3G, 4G, or 5G including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device, such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments, such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) reduce operating costs of robots; (ii) reduce network bandwidth occupied by robots to lessen a burden on local Wi-Fi networks; (iii) ensure data collected by robots is valuable; and (iv) enable scalability for robot operators to analyze, diagnose, and improve robot behaviors based on data collected by the robots. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device, such as, without limitation, digital signal processing devices ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Peripherals may include hardware accelerators configured to perform a specific function using hardware elements, such as, without limitation, encryption/decryption hardware, algebraic processors (e.g., tensor processing units, quadradic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units, such as specifically configured task units (not shown) that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators, such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; or repose cameras and sensors. According to exemplary embodiments, actuator unit 108 may include systems that allow movement of robot 102, such as to motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors, such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location, such as, for example, without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies, such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
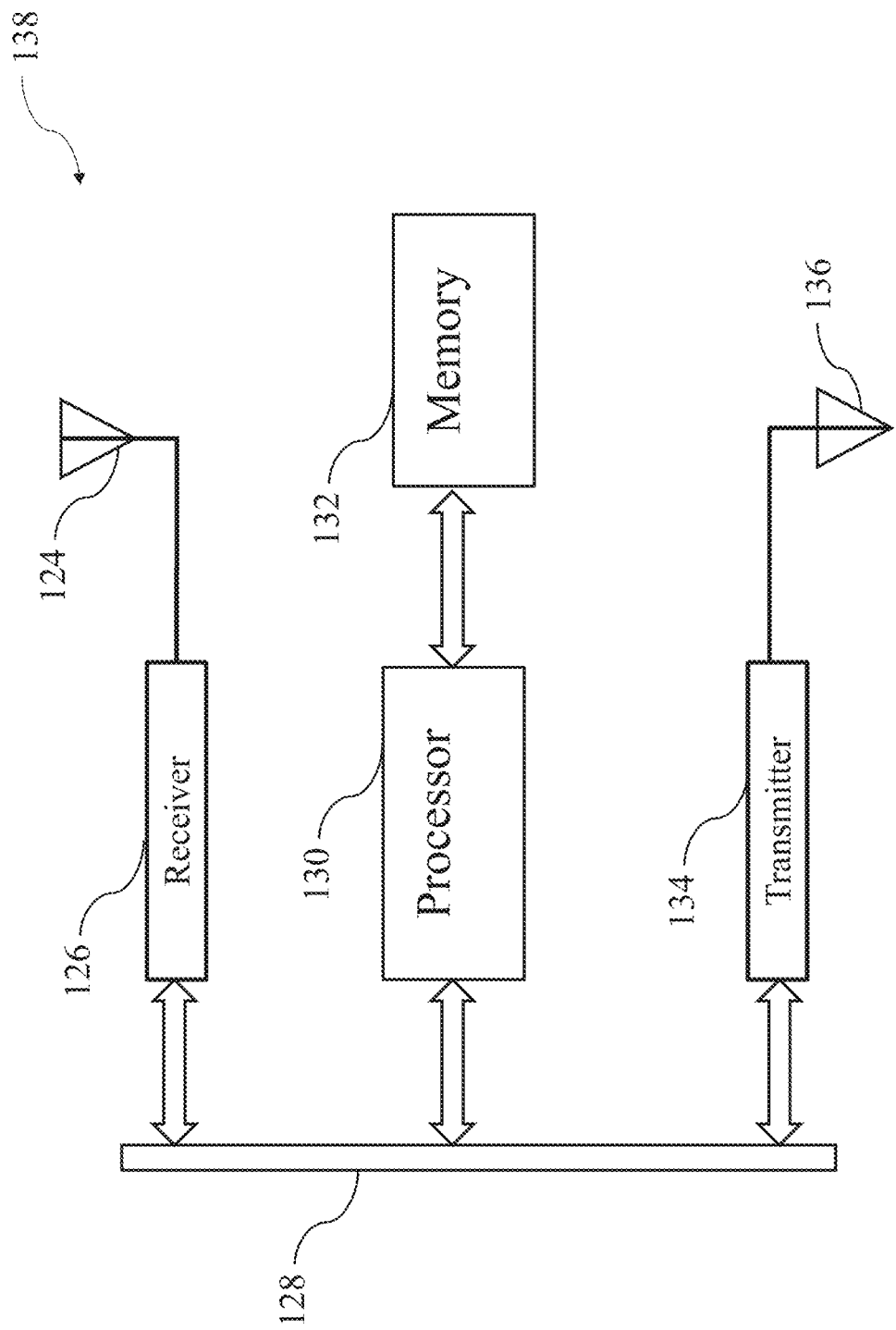
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer readable instructions thereon.

One of ordinary skill in the art would appreciate that a controller 118 of a robot 102 may include one or more processors 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processors 138 thereof executing computer readable instructions and, in some instances, the use of any hardware peripherals known within the art. Controller 118 may be illustrative of various processors 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processors 138 for performing high level tasks (e.g., planning a route to avoid obstacles) and processors 138 for performing low-level tasks (e.g., producing actuator signals in accordance with the route).

Figure 2:
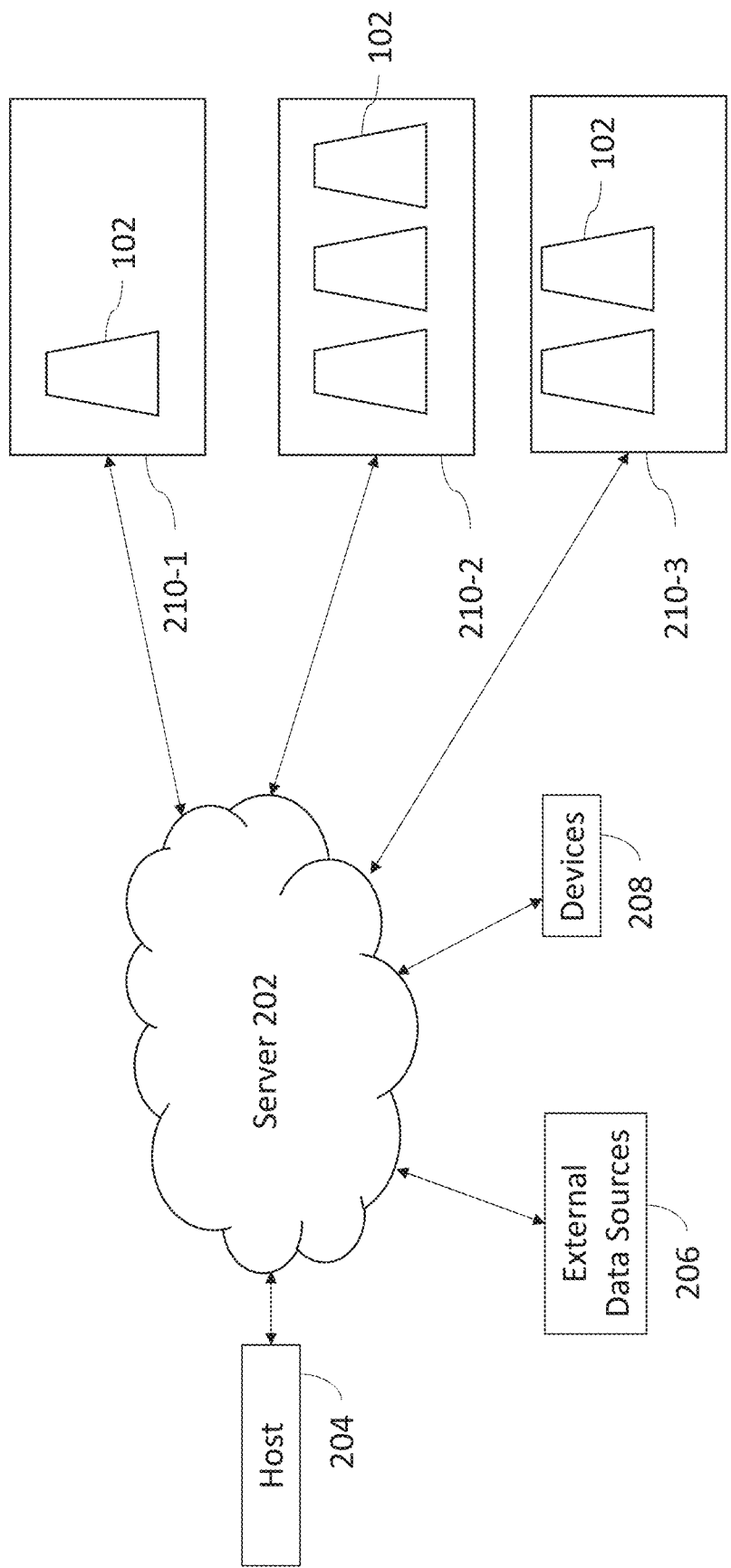
FIG. 2 illustrates a server coupled to a plurality of robots and devices in accordance with some embodiments of this disclosure.

FIG. 2 illustrates a server 202 and communicatively coupled components thereof in accordance with some exemplary embodiments of this disclosure. The server 202 may comprise one or more processing units depicted in FIG. 1B above, each processing unit comprising at least one processor 130 and memory 132 therein in addition to, without limitation, any other components illustrated in FIG. 1B. The processing units may be centralized at a location or distributed among a plurality of devices (e.g., a cloud server or dedicated server). Communication links between the server 202 and coupled devices may comprise wireless and/or wired communications, wherein the server 202 may further comprise one or more coupled antennas, routers, relays, etc. to effectuate the wireless communication. The server 202 may be coupled to a host 204, wherein the host 204 may correspond to a high-level entity (e.g., an admin) of the server 202. The host 204 may, for example, upload software and/or firmware updates for the server 202 and/or coupled devices 208 and robots 102 within robot networks 210, connect or disconnect devices 208 and/or networks 210 to the server 202, or otherwise control operations of the server 202. External data sources 206 may comprise any publicly available data sources (e.g., public databases, such as weather data from the national oceanic and atmospheric administration (NOAA), satellite topology data, public records, etc.) and/or any other databases (e.g., private databases with paid or restricted access) of which the server 202 may access data therein. Edge devices 208 may comprise any device configured to perform a task at an edge of the server 202. These devices may include, without limitation, internet of things ("IoT") devices (e.g., stationary CCTV cameras, smart locks, smart thermostats, etc.), external processors (e.g., external CPUs or GPUs), and/or external memories configured to receive and execute a sequence of computer readable instructions, which may be provided at least in part by the server 202, and/or store large amounts of data.

Lastly, the server 202 may be coupled to a plurality of robot networks 210, each robot network 210 comprising a local network of at least one robot 102. Each network 210 may separate individual robots 102 from other robots 102 of other networks based on device type (e.g., separate different types of cleaning robots), functionality (e.g., network 210-1 being cleaning robots and network 210-2 being object delivery robots), location, software version, manufacturer, and/or any other classification of a robot 102. For example, each separate network 210 may comprise one or more robots 102 operating within separate environments from each other. An environment may comprise, for example, a section of a building (e.g., a floor or room) or any space in which the robots 102 operate. Each robot network 210 may comprise a different number of robots 102 and/or may comprise different types of robot 102. For example, network 210-2 may comprise a scrubber robot 102, vacuum robot 102, and a gripper arm robot 102, whereas network 210-1 may only comprise a robotic wheelchair, wherein network 210-2 may operate within a retail store while network 210-1 may operate in a home of an owner of the robotic wheelchair or a hospital. A network may also comprise a group of robots having a similar function operating in separate environments but linked to a common server that monitors their operations (e.g. security robots in communication with a central security facility). In some exemplary embodiments, the server 202 may also facilitate communication among networks 210 (e.g. communication of environmental or navigation conditions from cleaning robots may be useful for other types of robots operating in the same environment).

Each robot network 210 may communicate data including, but not limited to, sensor data (e.g., RGB images captured, LiDAR scan points, network signal strength data from sensors 202, etc.), IMU data, navigation, and route data (e.g., which routes were navigated), localization data of objects within each respective environment (e.g., in the form of maps), and metadata associated with the sensor, IMU, navigation, and localization data. Specific methods for the uploading and communicating of this data between a robot 102 and server 202 will be discussed below. Each robot 102 within each network 210 may receive communication from the server 202 including, but not limited to, a command to navigate to a specified area, a command to perform a specified task, a request to collect a specified set of data, a sequence of computer readable instructions to be executed on respective controllers 118 of the robots 102, software updates, and/or firmware updates. One skilled in the art may appreciate that a server 202 may be further coupled to additional relays and/or routers to effectuate communication between the host 204, external data sources 206, edge devices 208, and robot networks 210 which have been omitted for clarity. It is further appreciated that a server 202 may not exist as a single hardware entity, but rather may be illustrative of a distributed network of computer readable memories and processors (i.e., a cloud server).

According to at least one non-limiting exemplary embodiment, each robot network 210 may comprise additional processing units as depicted in FIG. 1B above and act as a relay between individual robots 102 within each robot network 210 and the server 202. For example, each robot network 210 may represent a plurality of robots 102 coupled to a single Wi-Fi signal, wherein the robot network 210 may comprise in part a router or relay configurable to communicate data to and from the individual robots 102 and server 202. That is, each individual robot 102 is not limited to being directly coupled to the server 202 and devices 206, 208.

One skilled in the art may appreciate that any determination or calculation described herein may comprise one or more processors of the server 202, edge devices 208, and/or robots 102 of networks 210 performing the determination or calculation by executing computer readable instructions. The instructions may be executed by a processor of the server 202 and/or may be communicated to robot networks 210 and/or edge devices 208 for execution on their respective controllers/processors in part or in entirety (e.g., a robot 102 may calculate a coverage map using measurements 308 collected by itself or another robot 102). Advantageously, use of a centralized server 202 may enhance a speed at which parameters may be measured, analyzed, and/or calculated by executing the calculations (i.e., computer readable instructions) on a distributed network of processors on robots 102 and edge devices 208. Use of a distributed network of controllers 118 of robots 102 may further enhance functionality of the robots 102 as the robots 102 may execute instructions on their respective controllers 118 during times when the robots 102 are not in use by operators of the robots 102.

Figure 3:
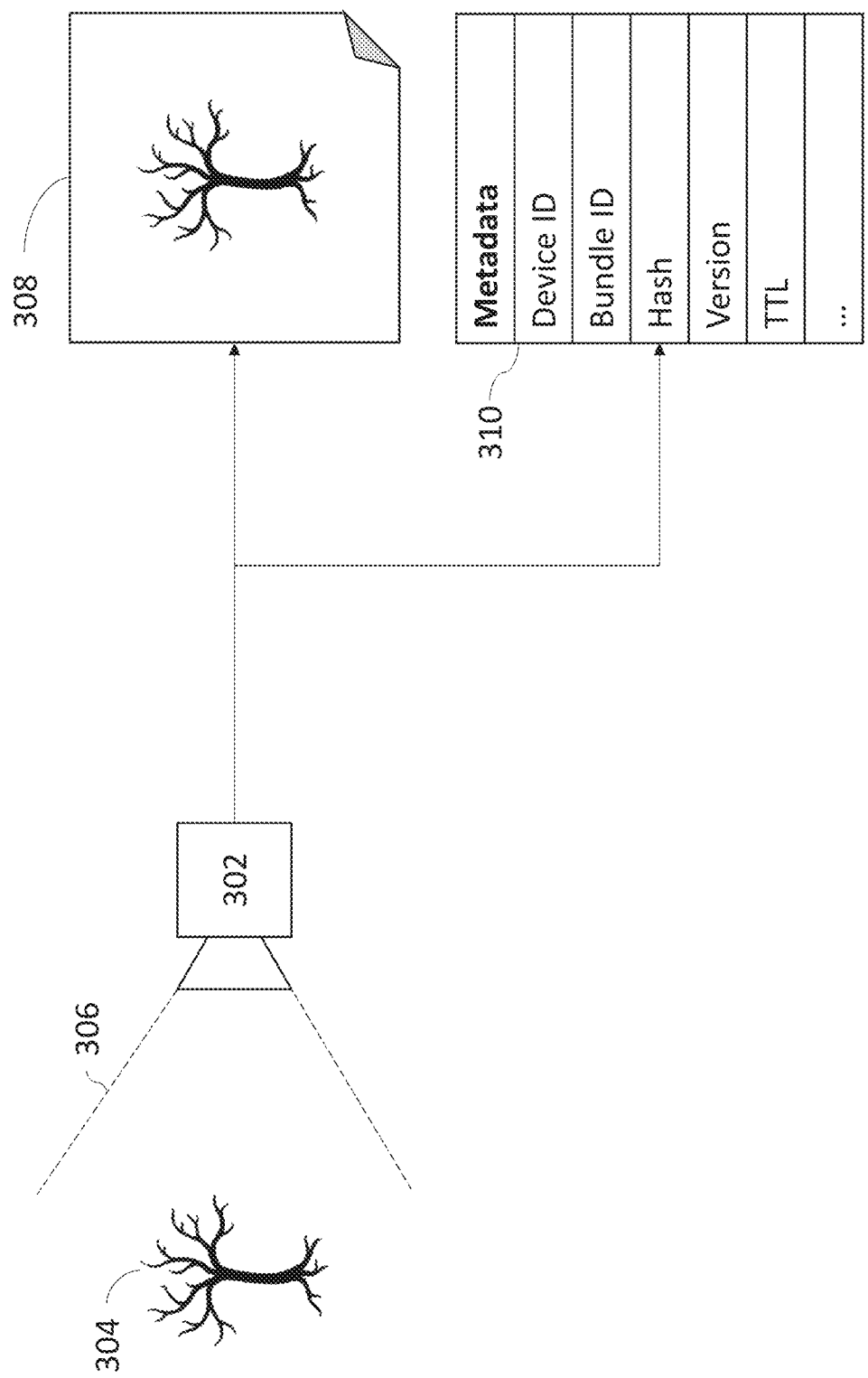
FIG. 3 illustrates a camera capturing binary data in the form of an image and producing metadata describing the image, according to an exemplary embodiment.

FIG. 3 illustrates a camera 302 capturing an image of a visual scene comprising a tree 304, according to an exemplary embodiment. The tree 304 is used purely for illustrative example and may be replaced with any other objects or things of a visual scene. The camera 302 may comprise a sensor of sensor units 114 of a robot 102, such as an RGB camera, depth camera, or another sensor. The camera 302 may produce an image 308 based on the visual data within the field of view 306. The image 308 may include a plurality of pixels encoded with color values. The image 308 may further include metadata 310 associated thereto. The metadata may include, without limitation, a device ID (e.g., an ID of the camera 302 or robot 102 of which the camera 302 is coupled to), a bundle ID, a hash, a version, a time to live ("TTL"), etc. The bundle ID and hash are included in metadata 310 to ensure secure and complete transmission of data between a robot 102 and a server 202, as will be discussed below. TTL is implemented in many devices with finite storage and defines a time (e.g., control-loop cycles, seconds, iterations, or other time units) that the image 308 will be stored on a device, such as memory 120 of a robot 102, wherein the image 308 may be deleted upon the TTL expiring.

As used herein, binary data may include any measurements, observations, facts, depictions, estimations, descriptions, features, and/or any other information. Binary data may typically include raw images, LiDAR point clouds, gyroscopic state measurements (e.g., a specific location on a map or in an environment), and the like. Metadata, as used herein, corresponds to information which describes the binary data, such as, without limitation, a time at which the binary data was acquired, a device from which the binary data is acquired, a location where the binary data is acquired (e.g., using a generic environment identifier, such as an alphanumeric sequence), TTL of the data on a device (e.g., a robot 102) comprising limited data storage, and/or other forms of metadata as discussed herein. By way of illustrative example, the image 308 includes information about a visual scene (i.e., pixel color values) and is considered binary data, whereas the device and time from which the image originates is the metadata 310 associated therewith. One skilled in the art may appreciate that metadata is typically substantially smaller than binary data, or includes fewer bytes of information, whereas binary data (e.g., images) may include hundreds, thousands, or millions of bytes of information.

According to at least one non-limiting exemplary embodiment, sensor 302 may comprise a LiDAR sensor (e.g., a planar LiDAR, 3D LiDAR, depth camera, structured light sensor, etc.) configured to produce point cloud representations of objects within the visual scene. Accordingly, the image 308 may instead be representative of a point cloud of the tree 304. Metadata associated with the point cloud may be substantially the same as for images and include timestamps, a device ID, a bundle ID, hash, TTL, etc. That is, sensor units 114 are not limited to producing images, nor is binary data limited to images produced by a camera sensor. One skilled in the art may appreciate that sensor 302 may comprise any interoceptive or exteroceptive sensor unit 114, wherein measurements from these sensors may include the raw measurement (e.g., temperature) and similar metadata associated with the measurement.

In some embodiments of robot 102, communications units 116 may utilize cellular LTE networks (e.g., 3G, 4G, 5G, and/or variants thereof) or local Wi-Fi networks to communicate with server 202. It is advantageous to reduce the bandwidth (i.e., bytes per second) uploaded to the server 202 to either (i) reduce costs of operating on LTE networks, or (ii) reduce bandwidth occupied by robot 102 communications using local Wi-Fi networks. Accordingly, the systems and methods disclosed below enable a server 202 to receive binary data from a robot 102 using a pull-based system in order to only request upload of data which is useful and/or important (e.g., to improve robotic performance).

Figure 4A:
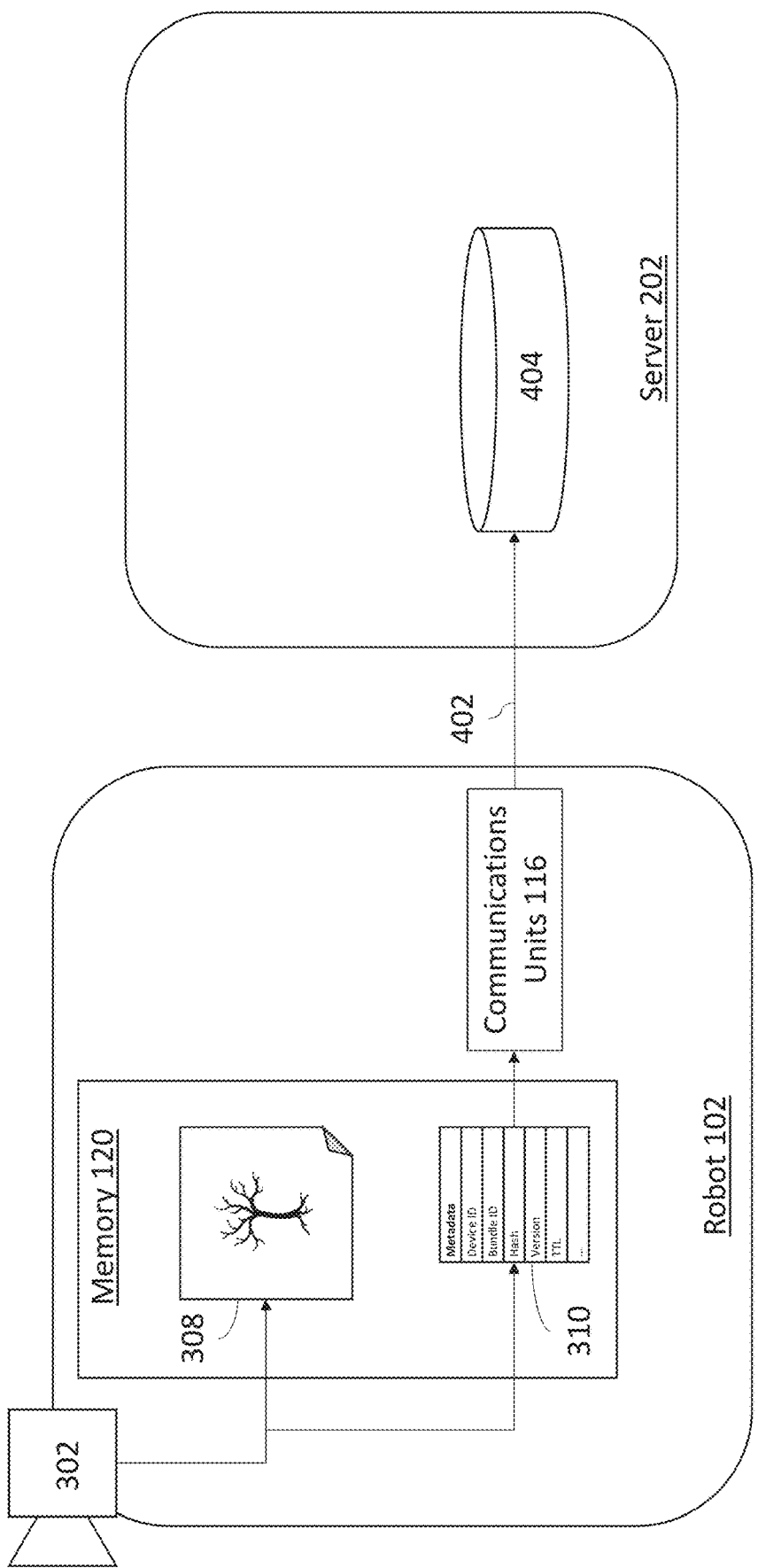
FIG. 4A-B illustrate a robot communicating with a server to provide the server with binary data to satisfy a query, according to an exemplary embodiment.

FIG. 4A illustrates a robot 102 including a camera 302 of sensor units 112 uploading metadata 310 to a server 202, according to an exemplary embodiment. As robot 102 operates, camera 302 may capture a plurality of images 308, such as a video stream. The controller 118 of the robot 102 may store these images 308 and metadata associated with the images 308 in memory 120. Upon the robot 102 being connected to an LTE network or Wi-Fi network, the controller 118 may provide metadata 310 to communications units 116 to cause the communications units 116 to upload or send the metadata 310 associated with the image 308 to the server 202, as shown by communications 402. Communications 402 may include a wired and/or wireless communication channel. In some instances, the robot 102 may not be connected to the LTE or Wi-Fi networks and may instead upload bundles of data to the server 202 at a time upon reconnecting to the LTE or Wi-Fi networks. For example, the camera 302 may capture 100 images during a period where the communications units 116 are not in connection with the LTE or Wi-Fi networks, wherein the controller 118 may upload a bundle which includes the metadata associated with the 100 images upon reconnecting with the network(s). These bundles of data may include a bundle ID, as shown in FIG. 3, corresponding to a unique identifier (e.g., an alphanumeric) associated with the bundle of metadata uploaded to the server 202.

To ensure complete and secure transmission of data, a hash may be produced. Hashes comprise algorithmically generated strings of characters generated based on an input string of characters, the generated string of characters (i.e., "the hash") is typically shorter than the input string but is not required to be shorter. The hash may be further utilized to compare a received string or file with an original string or file to determine if the original file is the same as the received file. That is, the hash produced by controller 118 for a given input file (e.g., image(s) 308) should be the same as hashes produced by a processor 130 of server 202 given the same input file. The hashes may be produced using any known algorithm, such as, without limitation, the SHA-family (e.g., SHA-256). Alternatively, or in addition to, parity bits and/or checksums may be utilized to verify that the metadata 310 transmitted by the robot 102 arrives in its entirety and without error to the server 202. The hash is considered as metadata, as shown in FIG. 3, because the hash corresponds to information about the transmission 402 and/or bundle of data being transmitted to the server 202.

The metadata associated with the binary data collected by the robot 102 indicates events which have occurred. An event, as used herein, may correspond to the generation of data by a sensor (e.g., event of a new image being captured) or a scenario experienced by the robot 102 (e.g., robot 102 being unable to move without collisions). For example, the metadata indicates events, such as images being captured, have occurred, wherein information about what occurred is stored within the binary data (i.e., depicted in the images). As another example, an event may comprise of a robot 102 becoming stuck (i.e., unable to move without collisions), wherein a timestamp, device ID, location, route ID, etc. may all comprise metadata which indicates the event has occurred. To determine what occurred to cause the robot 102 to become stuck, the binary data associated with the event of the robot 102 becoming stuck must be reviewed (e.g., camera feeds, gyro data, computer readable maps produced at the time, etc.).

Server 202 may include one or more computer readable storage mediums, represented by memory 404. Memory 404 may be illustrative of a single computer readable storage medium, or a plurality of coupled storage mediums distributed among a plurality of devices and locations (i.e., cloud storage). It is appreciated that memory 404 may be substantially larger than memory 120 of a robot 102 (e.g., 10, 100, 1000 times larger or more) and may be increased without disturbing any operation of a robot 102 whereas robots 102 may include a fixed size memory 120 which may be increased by coupling additional computer readable memories to the hardware of the robot 102. For a small number of robots 102 operating within a few environments, adding additional computer readable memory (i.e., storage) may be trivial; however, for hundreds or thousands of robots 102 operating in many different environments separated by large distances, adding additional hardware to all robots 102 may be substantially more difficult than increasing storage capacity of memory 404 of server 202.

Over time, the binary data 308 and metadata 310 may be deleted from the memory 120 of the robot 102 in order to provide memory space for new data, as memory 120 comprises finite storage space. Increasing the storage capacity of memory 120 requires physical alteration (i.e., addition of new hardware) to the robot 102, which can be costly. As discussed further below, data are typically deleted from memory 120 based on their assigned time to live (TTL). It is advantageous for operators of the robots 102 to receive some information regarding the performance and behaviors of the robot 102, thereby requiring some form of record-keeping. The record-keeping comes in the form of the metadata uploaded via transmission 402. The metadata stored in memory 404 may provide indirect information about performances of the robot 102, such as the robot 102 capturing images at certain locations or times, encountering specific scenarios (e.g., assist events), and/or the completion of tasks. That is, the metadata indicates the occurrence of certain events. The metadata, being an indirect indication of robot 102 performance, may be useful for operators of robots 102 to determine which binary data collected by the robot 102 is of value. The binary data may be of use for operators to learn from the robot 102 experiences to improve, e.g., its motion planning in certain scenarios. For example, binary data collected by sensor units 114 of the robot 102 while the robot 102 navigates straight down a hallway without incident may be of less value to operators of the robot 102 compared to binary data collected just prior to the robot 102 encountering an issue which caused an error in path planning, which may be utilized by the operators to determine improvements to software of the robot 102. Accordingly, only binary data which is of interest to operators of robots 102 and/or host 204 should be uploaded to the server 202 to minimize communications bandwidths occupied by the robot 102.

The metadata stored in memory 404 may be arranged in a searchable format such that queries may be imputed by devices 208 and/or host 204 coupled to the server 202. For example, a human operator may input a query to the server 202 which requests information related to a performance of a robot 102, such as querying if the robot 102 encountered an assist event. An assist event may include any event in which the robot 102 is unable to complete an autonomous task and requests human assistance to continue. Some assist events may require human assistance to continue operations autonomously, such as physically moving the robot 102 out of a tight space or clearing obstacles along its path. Assist events may occur when, for example, a robot 102 gets stuck (e.g., between objects with no navigable paths available) and/or receives unreliable sensor data (e.g., dirty sensor lenses), or when a path the robot 102 is following becomes blocked, hardware/software failures occur, and/or in any other scenario where a human is required to assist the robot 102 or the robot 102 is required to cease autonomous operations. It may be advantageous for the human operator to view binary data associated with the assist event, such as a video feed, sensory data, computer readable maps, and/or other data collected and processed by the controller 118 during or about a time window surrounding the assist event, wherein the time window is specified by the query.

Figure 4B:
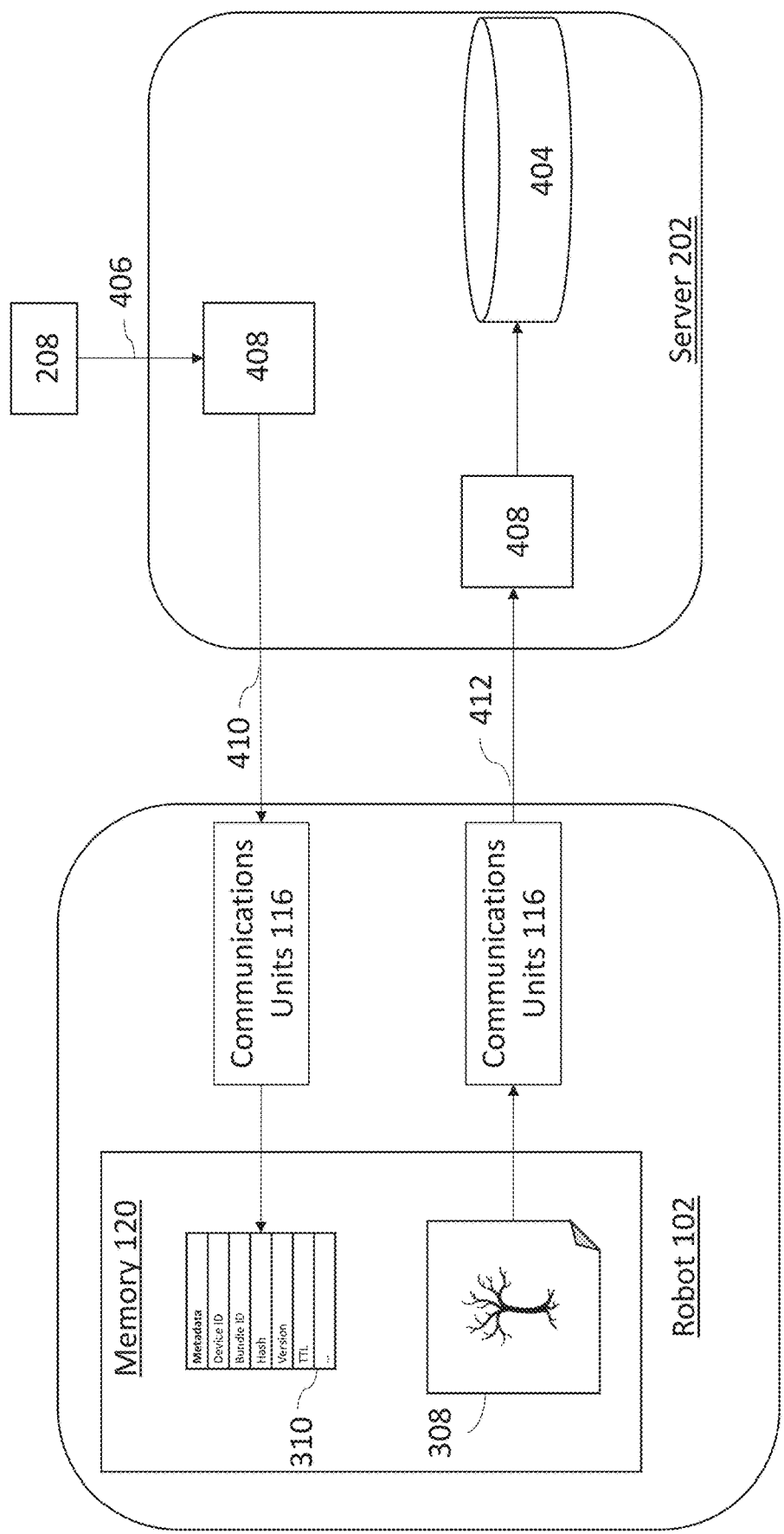

FIG. 4B illustrates the server 202, previously illustrated in FIG. 4A, receiving a query 406 from a device 208 and/or host 204 corresponding to a request for binary data from the robot 102, according to an exemplary embodiment. The query 406 may correspond to a human operator requesting binary data from one or more robots 102 coupled to the server 202, such as a specific robot 102, robots 102 of a robot network 210, or all robots 102 coupled to the server 202. Query 406 may be received by a communications unit 408, the communications unit may include any devices configured to effectuate wired/wireless communications between devices 208 and server 202, such as those described with respect to communications units 116 of the robot 102 in FIG. 1A. A processor 130 (not shown for simplicity) of the server 202 may, upon receiving the query 406, configure the communications unit 408 to output a wired and/or wireless signal 410 to the robot 102, wherein communications units 116 of the robot 102 receives the signal 410. It is appreciated that, although not explicitly illustrated, operative units 404, 408 of server 202 are controlled via at least one processor 130 executing computer readable instructions from a memory 132. Similarly, operative units 116, 120 are controlled via controller 118 executing computer readable instructions from memory 120.

Upon receipt of the signal 410, the controller 118 of the robot 102 may mark one or more pieces of binary data stored in memory 120. Following the above example, wherein query 406 corresponds to a request for binary data associated with an assist event, the signal 410 may request the binary data associated with the assist event, such as image data, computer readable maps produced, motor commands, etc. issued during and prior to the assist event occurring. It is recognized that, from the perspective of the server 202, only metadata associated with the assist event is stored (e.g., a timestamp, an assist type, etc.) and binary data (e.g., video feeds) are only stored on the robot 102. That is, memory 404 contains information which indicates that the assist event has occurred, but no binary data related to what occurred during the assist event (e.g., video feeds, computer readable maps produced, point cloud data, etc.). The controller 118 may parse the memory 120 for the binary data associated with the metadata listed in the request and mark the corresponding binary data for upload to the server 202, wherein the collective data to be uploaded corresponds to a bundle of binary data. Upon the communications units 116 receiving connection to an LTE or Wi-Fi network, the controller 118 causes the communications units 116 to emit a signal 412 which uploads the marked binary data to the server 202 to be stored in memory 404. The binary data may include, for the assist event example, a video feed from a camera (e.g., 302) just prior to the assist event occurring, computer readable maps produced at the time, signals to actuator units 108, and/or any other diagnostic data specified by query 406. This bundle of data communicated via signal 412 may include, without limitation, a bundle ID metadata and a timestamp such that the server 202 may associate the specific binary data to a specific request and a specific upload. In some embodiments, subsequent to the issuance of signal 412, the binary data is deleted from memory 120 to preserve memory space on the robot 102 after its upload to the server 202 as, typically, binary data associated with past executions of a route is not useful to a robot 102 during execution of its current route beyond mapping considerations (i.e., updating a map of an environment after every route run).

It can be appreciated that a request for binary data associated with an assist event may include all binary data collected by all sensors of sensor units 114 and/or produced by controller 118 related to the assist event or only specific binary data collected by specific sensors and/or specific controller 118 processes. The amount and type of binary data uploaded may be dependent on the type of assist event. For illustration, binary data requested related to an assist event caused by a navigation problem, such as an obstructed path, may be limited to data collected by sensors related to collecting data needed for navigation (e.g., LiDAR, images, etc.) and/or computer readable maps produced during the assist event and may not include data collected by sensors internal to the robot 102. An assist event related to an internal condition of the robot 102, such as hardware failures (e.g., a cleaning robot running out of cleaning supplies), may be limited to data from internal sensors. The request for what binary data may be uploaded may, in some embodiments, be predetermined to correspond to the type of assist event encountered.

Figure 5:
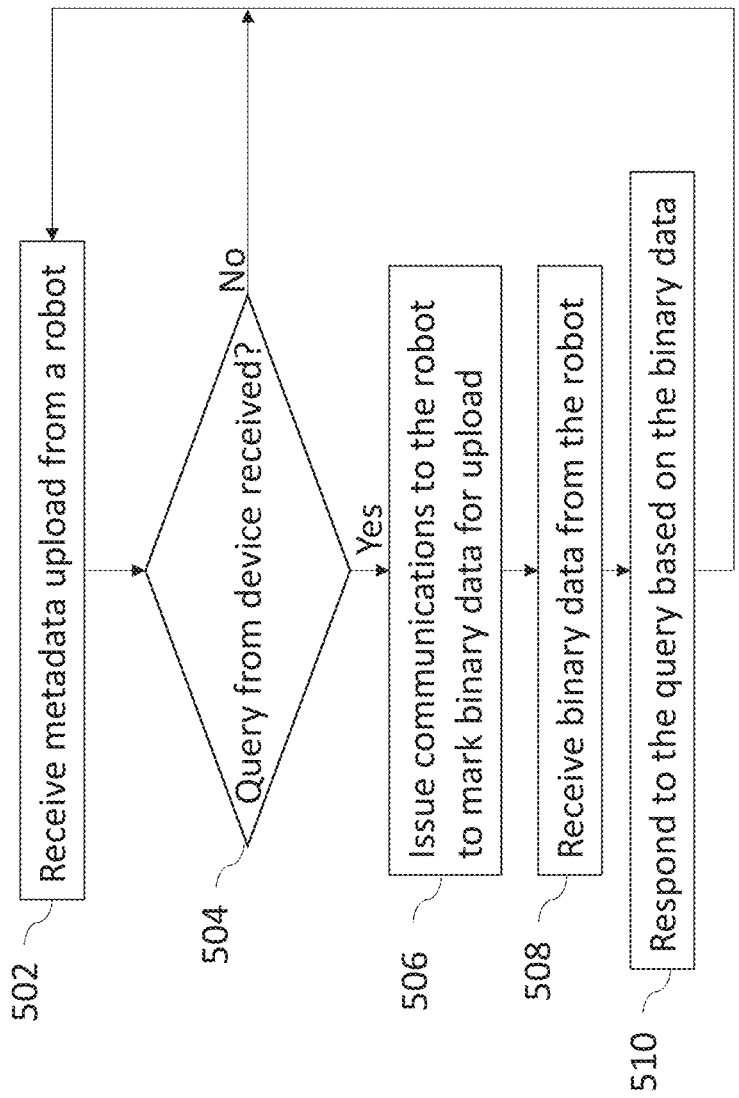
FIG. 5 is a process flow diagram illustrating a method for a server to handle a query, according to an exemplary embodiment.

FIG. 5 is a process flow diagram illustrating a method 500 for a processor 130 of a server 202 to receive and handle queries from a device 208, according to an exemplary embodiment. It is appreciated that steps of method 500 may be effectuated via the processor 130, or multiple processors 130 of the server 202, executing computer readable instructions from a non-transitory computer readable storage medium. The device 208 may include any device coupled to the server 202, such as, without limitation, a smartphone, a personal computer, tablet, and the like.

Block 502 comprises the processor 130 receiving metadata upload from a robot 102. The metadata upload may include communications received from the robot 102, the communications including metadata associated with functions of the robot 102. The metadata may include, for example, timestamps of acquired images/videos, a device ID associated with the robot 102 (e.g., robot #10202), a device ID associated with the sensor unit 114 which captures data, metadata associated with the production of computer readable maps, metadata associated with any changes to an environment or route of the robot 102, metadata associated with the upload itself (e.g., including a bundle ID, a timestamp, etc.), a hash associated with the upload itself, and/or any other metadata which describes the functions performed by the robot 102. The metadata upload from the robot 102 may be received periodically (e.g., every minute, 10 minutes, 10 seconds, etc.) and/or whenever the robot 102 is connected to the server 202 via an LTE network or Wi-Fi network (e.g., as a continuous stream of data).

Block 504 comprises the processor 130 determining if a query from a device 208 was received. The query may include a request for binary data collected by the robot 102. The query may be received via wired/wireless communications between the device 208 and the server 202. The binary data requested may correspond to at least in part the metadata collected and stored on the server 202 memory 404. To request the binary data from the robot 102, the query may include, but is not limited to, the device ID associated with the desired robot 102 (e.g., robot #10202), one or more sensor units 114 from which the binary data collected therefrom is desired, a timestamp or window within which the binary data is requested, and/or other binary data useful to satisfy the query.

Queries include any request for data relating to performance of one or more robots 102. Queries may be input by any device 208 coupled to the server 202, such as cell phones, tablets, personal computers, and the like. Queries may be inputted to the server 202 to request specific data from a specific robot 102 or may be automatically generated, as discussed below. Queries may include a device 208 requesting from server 202 information regarding robot 102 performance. In some instances, queries may be satisfied by metadata stored in memory 404 alone. For example, a query may request a count for a number of occurrences of a path of a robot 102 being blocked, wherein metadata stored in memory 404 may include at least a timestamp corresponding to instances where a "path is blocked" assist event occurs. In this instance, assuming the metadata stored on the server memory 404 is up-to-date, no transmission of data from the robot 102 is required. In other instances, the queries may request in part binary data stored in memory 120 of the robot 102. For example, an operator of a device 208 may query the server 202 to determine what specific object obstructed a path of a robot 102 based on images (i.e., binary data) collected by the robot 102 during the assist event.

In some embodiments, queries may be automatically generated by the processor 130 under some conditions. For example, processor 130 may automatically request binary data from a specific subset of sensors and computer readable maps produced following a subset of assist event types. Assist event types may include the robot 102 colliding with an object, a path being obstructed, a tight turn experienced (where collision is likely to occur or the robot 102 is stuck), detected hazards (e.g., wet floors, cliffs, etc.), software/hardware failures, internal temperature of components of the robot exceeding a threshold, and/or any other reason which may cause a robot 102 to cease autonomous operations. The controller 118 of the robot 102 may execute instructions to, at least in part, determine a context of the event (e.g., path blocked, sensor/hardware failure, etc.). The assist event type may be denoted within metadata uploaded to the server 202 in block 502, wherein the processor 130 may automatically generate a query requesting binary data from a robot 102 if the robot 102 encounters an assist event type of a predetermined subset of all assist event types. For example, robot 102 may include a floor cleaning robot comprising a water tank used to clean floors, processor 130 may automatically generate a query requesting binary data from a robot 102 subsequent to the robot 102 colliding with an object; however, the processor 130 may not automatically generate a query when the water tank is empty (which also causes the robot 102 to cease autonomous cleaning). Binary data requested by an automatically generated query may include binary data from a predetermined subset of sensor units 114 and/or results of a subset of processes executed by controller 118. For example, if a robot 102 encounters an obstructed path, the processor 130 of server 202 may only request data from a front facing camera and a computer readable map. Conversely, if the robot 102 becomes stuck in a tight turn, processor 130 may request data from the front camera, side cameras, and computer readable maps.

For example, a robot 102 may encounter an assist event, wherein autonomous functions are impeded and the robot 102 requires assistance from a human. The robot 102 may signal the server 202 and/or a device 208 that an assist event has occurred, including metadata tagged with the type of assist event. Depending on the type of assist event, server 202 and/or a human user may input a query for binary data related to the event as described above. In some events, a simple characterization of the event and the location of the robot are sufficient for a human to respond to the assist event. However, it may be desirable for operators of the robot 102 to study the scenario which caused the assist event to improve future performance of the robot 102. The operators may utilize a device 208, such as a personal computer, to input a query requesting data from sensor units 114, such as camera data (e.g., images or video), LiDAR measurements, computer-readable map(s), odometry data (i.e., location of the robot 102), and/or any other binary data collected by the operative units 104 of the robot 102 during and prior to the assist event occurring.

According to at least one non-limiting exemplary embodiment, devices 208 may be coupled with one or more robots 102. For example, an operator of a robot 102 working within the same environment may pair a cell phone with the robot 102 (e.g., over Wi-Fi, cellular LTE, Bluetooth, radio, etc.) such that the operator may receive updates/notifications relating to the robot 102 behavior. As another example, the operator may pair their cell phone with the server 202, wherein the server 202 acts as a link between the phone and the robot 102. The cell phone may be used as a device 208 to input a query to the server 202. As an example, a robot 102 may encounter an assist event (e.g., path is blocked). Metadata pertaining to the assist event may be uploaded to the server 202 (block 502), wherein the server 202 may issue a notification to the cell phone device 208 of the operator. The operator may be at a separate location from the robot 102 and may input a request on his/her cell phone to localize the robot 102 within the environment such that the operator may go assist the robot 102. Server 202 may receive a query from the cell phone, comprising a request for a location of the robot 102 (i.e., a computer readable map of the environment), and request the computer readable map generated by the robot 102 to be uploaded. This map may be subsequently communicated to the cell phone.

Upon the processor 130 determining that no query was received, the processor 130 returns to block 502 and receives metadata uploads from the robot 102.

Upon the processor 130 determining that a query was received, the processor 130 continues to block 506.

According to at least one non-limiting exemplary embodiment, processor 130 may receive substantially continuous metadata uploads from a robot 102 while contemporaneously performing the steps of blocks 504-510 of method 500. For example, processor 130 may include separate cores performing the two operations in parallel. As another example, processor 130 may be illustrative of two or more processors performing the operations in parallel. That is, method 500 is not intended to illustrate the server 202 halting the receipt of metadata from robot 102 while steps of methods 504-510 are executed.

Block 506 comprises the processor 130 issuing a communication to the robot 102 which causes the controller 118 of the robot 102, upon receipt of the communication, to mark a bundle of binary data for upload to the server 202. The marked binary data may correspond to metadata (which describes the marked binary data) stored in the memory 404 of the server 202 and identified by the processor 130 as being pertinent to responding to the query. Specifically, the binary data counterpart of the identified metadata is identified by processor 130 as being useful to responding to the query.

Following the above example, wherein the query includes a request for binary data surrounding an assist event, the communications may include a request for sensor readings associated with a requested timestamp (and, in some instances, readings from specific sensors as specified by the query), a computer readable map utilized by the controller 118 during the assist event, odometry measurements, and the like.

According to at least one non-limiting exemplary embodiment, processor 130 may mark specific metadata stored in memory 404 corresponding to the desired binary data for upload from the robot 102. As the robot 102 operates, the controller 118 of the robot 102 may continuously (assuming network connection is established) call to the server 202 to determine if the controller 118 should upload any binary data. That is, server 202 may receive a communications from the robot 102 corresponding to the robot 102 asking if it should upload any binary data, the binary data to be upload being marked in memory 404 of the server 202 in response to the query. Stated differently, the communications issued in block 506 may be in response to the robot 102 asking if it should upload any binary data, wherein the communications in block 506 may be a reply comprising a request for the binary data necessary to satisfy the query. Providing the request for the robot 102 to upload the desired binary data subsequent to the robot 102 calling the server to determine if there is any binary data to be uploaded may be advantageous in ensuring the robot 102 is connected to an LTE or Wi-Fi network and that the issued communications by the server 202 are received by the robot 102.

Block 508 comprises the processor 130 of the server 202 receiving the requested binary data in response to the communications issued in block 506. The steps executed by the controller 118 of the robot 102 to upload its metadata and respond to the issued communications is described below in FIG. 6.

Block 510 comprises the processor 130 of the server 202 responding to the query based on the binary data received. In some instances, the response may correspond to the processor 130 communicating the binary data directly to the device 208 which inputted the query to the server 202. In some instances, the incoming binary data may be analyzed using one or more preconfigured filters or algorithms (e.g., the server 202 may embody a neural network configured to identify a feature within images received from the robot 102 in response to a query requesting the features be identified). In some instances, the binary data is compressed prior to communicating the binary data to the device 208.

Advantageously, only metadata is uploaded to the server 202 unless the corresponding binary data is specifically requested by the server 202 in response to a query, thereby significantly reducing the network bandwidth occupied by the robot 102 and server 202 communications over time. Stated differently, only requested binary data is uploaded which reduces the communications bandwidth between the robot 102 and server 202. Reduction of network bandwidth usage may be used for (i) reducing a cost of operating robots 102 using LTE networks, and/or (ii) reduce usage of local Wi-Fi networks that are also utilized by humans. Further, tracking the functions and behaviors of a robot 102 using only its metadata may ensure that the memory 404 of the server 202 only includes binary data which is useful to operators of the robot 102 and enables rapid searching (i.e., querying) of data stored in the memory 404.

Figure 6:
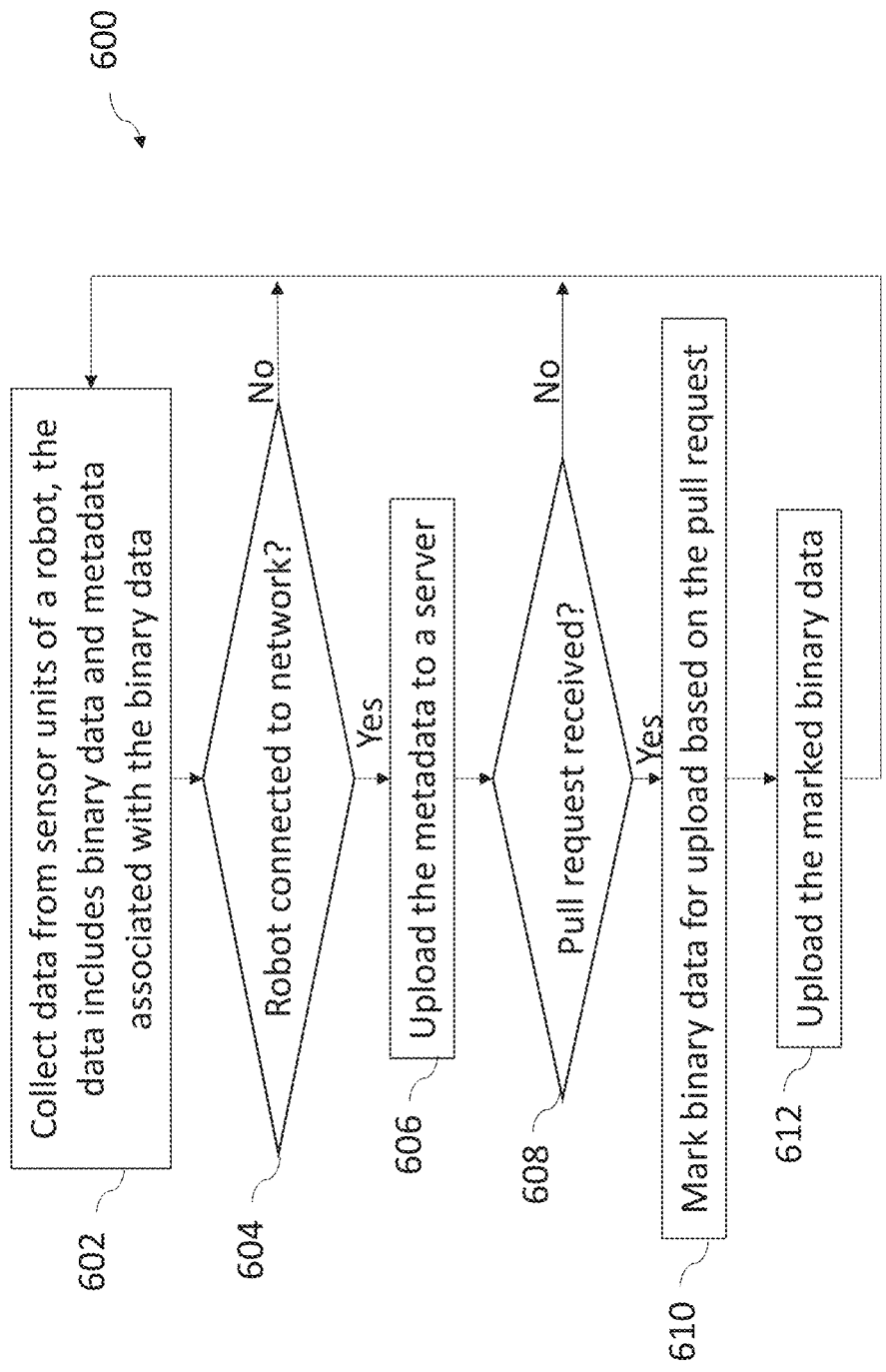
FIG. 6 is a process flow diagram illustrating a method for a robot upon receiving a communication from a server corresponding to a query, according to an exemplary embodiment.

FIG. 6 is a process flow diagram illustrating a method 600 for a controller 118 of a robot 102 to manage data collected by its various sensor units 114 and/or produced by the controller 118 executing computer readable instructions from memory 120 to operate the robot 102, according to an exemplary embodiment. Steps of method 600 may be effectuated by the controller 118 executing computer readable instructions from memory 120.

Block 602 comprises the controller 118 collecting data from sensor units 114. The data collected may include binary data, such as raw measurements (e.g., distance measurements using LiDAR), processed measurements (e.g., point clouds), images, readings, and/or any other types of data collected by sensor units described above in FIG. 1A; and metadata associated with the binary data, including time stamps, device IDs, versions, etc. Binary data may further include information created by the controller 118 during operation of the robot 102, such as computer readable maps produced; routes executed, and changes thereto in response to a dynamic environment; tasks performed; and/or motor commands issued to actuator units 108.

Block 604 comprises the controller 118 verifying if the communications units 116 are coupled to an LTE or Wi-Fi network. In some instances, the connectivity must reach a threshold value and/or be maintained for a threshold number of seconds to ensure a reliable connection to the network.

Upon the controller 118 detecting a connection to a network, the controller 118 moves to block 606.

Upon the controller 118 detecting no connection to any network, the controller 118 returns to block 602.

Block 606 comprises the controller 118 uploading metadata to the server 202, the metadata may correspond to metadata associated with any binary data collected in block 602 and/or since the prior iteration of method 600. For example, the metadata may include a device ID corresponding either to a specific sensor unit which captures some binary data, a device ID corresponding to the robot 102, a timestamp, a lifetime (i.e., a time for which the binary data is stored on memory 120), and/or other metadata which describes the binary data. It is appreciated that method 600 is cyclical, wherein the metadata uploaded in block 610 corresponds to any metadata related to binary data collected after the prior iteration of method 600. In some instances, robot 102 may not be coupled to a network, wherein the metadata uploaded to the server 202 corresponds to metadata related to binary data collected since the prior upload of the metadata when the robot 102 was connected to the network.

According to at least one non-limiting exemplary embodiment, summaries may be uploaded as metadata. Summaries may include one or more metrics which provide information regarding robot 102 performance. Some summaries may be unrelated to any specific piece of binary data but are instead based on multiple pieces of binary data. For example, robot 102 may include a floor cleaning robot, wherein a summary may include a value corresponding to floor space cleaned, hours operated, routes executed, and other metrics for describing performance of the robot. Summaries may be configured based on the type of robot 102 and/or its specific functionalities. As another example, a robot 102 configured to move objects from one location to another (e.g., a robotic fork-lift, tug, etc.) may upload a summary detailing how many objects were transported, where they were transported, hours operated, routes executed, and/or other performance metrics. It is appreciated that these summaries comprise data describing robot 102 performance/behavior and is thereby classified as metadata to be uploaded continuously or when available (e.g., at the end of a route) following method 600. It is also appreciated that these summaries may include only a few characters of text (e.g., 100 characters) and are substantially smaller than typical binary data (e.g., images), thereby requiring very little network bandwidth to upload while providing useful information to the server 202.

Block 608 comprises the controller 118 determining if any binary data stored in memory 120 is marked for upload. Binary data may be marked for upload to the server 202 upon the communications units 116 receiving a signal from the server 202, the signal requests a specified set or bundle of binary data to be uploaded. The issuance of the communication is shown in step 506 in FIG. 5 above.

According to at least one non-limiting exemplary embodiment, controller 118 may communicate with the server 202 to determine if the server 202 has marked any metadata in its memory 404 in response to a query. That is, controller 118 utilizes communications units 116 to call to the server 202 and determine, based on a response to the call, if any binary data is to be uploaded. The marked metadata in memory 404 of server 202 corresponding to binary data stored on the robot 102 memory 120 which is to be uploaded to the server 202. In response to the call, the server 202 may communicate the marked metadata to the controller 118 to cause the controller 118 to mark the binary data counterpart in its memory 120 for upload.

Upon the controller 118 determining there is binary data which is marked for upload to the server 202, the controller 118 moves to block 610.

Upon the controller 118 determining no binary data is marked for upload to the server 202, the controller 118 moves to block 612.

Block 610 comprises the controller 118 uploading any marked binary data to the server 202 via communications units 116. The communications units 116 may upload the binary data to the server 202 using an LTE or Wi-Fi network. In some embodiments, the binary data uploaded may be encrypted to ensure secure transmission of the data. In some embodiments, a hash, checksum, and/or parity bits may be utilized to ensure complete and error-free transmission of the binary data. In some embodiments, the binary data is compressed, the specific compression algorithm(s) used may depend on the type of binary data uploaded (e.g., images may be compressed differently than video or point clouds). In uploading the binary data, the controller 118 also generates metadata corresponding to the upload, such as a bundle ID which is a unique identifier for the specific upload or bundle of binary data being transmitted. Other metadata may be included, such as timestamps and an ID for the robot 102 uploading the binary data. The binary data uploaded is marked for upload in the following blocks 612-614 following a pull request issued by the server 202.

Block 612 comprises the controller 118 determining if a pull request is received. The pull request may correspond to the communications issued in block 506 of method 500 described in FIG. 5 above. That is, the pull request comprises a request by the server 202 for the robot 102 to upload a specified bundle or set of binary data. The binary data to be uploaded within the bundle may be determined based on the server 202 satisfying a query. For example, the pull request may comprise a request for all map data produced by the robot 102 during a specific execution of a specific route.

According to at least one non-limiting exemplary embodiment, the pull request may be received as a result of the controller 118 communicating with the server 202 to check if any binary data is to be uploaded. The binary data to be uploaded corresponding to marked metadata stored in the server memory 404. That is, a pull request is not intended to be limited to a direct communications from the server 202 to the controller 118 and may be the result of multiple communications between the two devices (e.g., to ensure a secure and stable connection).

Upon the controller 118 determining no pull request was received, the controller 118 returns to block 602.

Upon the controller 118 determining a pull request was received, the controller 118 continues to block 614.

Block 614 comprises the controller 118 marking binary data, specified by the pull request, for upload to the server 202. Marking of the binary data may include storing the binary in a memory buffer, encoding the binary data with a positive upload bit or encoding, and/or any other method of ensuring that the requested binary data is uploaded to the server. The requested binary data may be uploaded during step 614, provided the robot 102 is coupled to the network. The marked binary data, collectively being a bundle of data, may be assigned a bundle ID corresponding to a unique identifier associated with the binary data. The bundle ID as well as some metadata associated with the upload of the marked binary data, such as the bundle ID, timestamps, robot 102 identification numbers, etc., may be communicated to the server 202.

Advantageously, method 600 causes the controller 118 of the robot 102 to only upload binary data in response to a pull request from server 202. That is method 600 comprises, in short, the robot 102 verifying it is connected to a network (e.g., LTE or Wi-Fi) and uploading metadata to the server. Such metadata may provide the server 202 with information corresponding to events experienced by the robot 102, such as, without limitation, the acquisition of new sensory data, updates to computer readable maps, signals to actuator units 108, assist events encountered, failures, completions of routes/tasks, and the like. The metadata, however, only indicates that such events occurred (e.g., route was blocked), while the binary data associated with the metadata would provide more context to such events (e.g., route was blocked by a shopping cart). Since binary data is typically substantially larger than its metadata counterpart, only useful binary data is transmitted to the server 202, provided a network connection exists (as shown by method 600 being cyclic, wherein binary data is marked and subsequently uploaded to server 202 if the connection to the network exists). Accordingly, the network bandwidth usage by the robot 102 transmitting binary data to the server 202 is reduced while preserving binary data which may be of use for robots 102, robot operators, and/or designers of the robots 102 to accurately track the performance of the robots 102.

Although the above disclosure in FIG. 5-6 illustrate methods 500, 600 for a robot 102 and server 202 to respond to queries, some robots 102 may be configured to upload binary data under specific and pre-determined circumstances. According to at least one non-limiting exemplary embodiment, controller 118 may be configured to automatically upload binary data associated with some or all assist events, the binary data uploaded may include binary data collected within a time window surrounding the assist event. In some embodiments, only specific assist events may cause the robot 102 to automatically upload binary data, such as collision events, path blockages, execution of tight turns, and/or software failures. Such events which cause automatic upload of binary data may include specified time windows about the event of which specified components of binary data are uploaded. For example, path blockage assist events may comprise a 30 second time window surrounding the assist event in which binary data collected by a specified set of sensor units 114 is uploaded. As another example, for software failures, software execution logs may be transmitted to the server 202 while data from sensor units 114 may be retained in memory 120 of the robot 102. It is appreciated, however, that minimizing automatic upload of binary data may be advantageous in reducing network bandwidth used by robots 102, wherein one skilled in the art may appreciate that only a small subset of events should cause the robot 102 to upload binary data to the server 202 to minimize the network bandwidth usage.

Figure 7A:
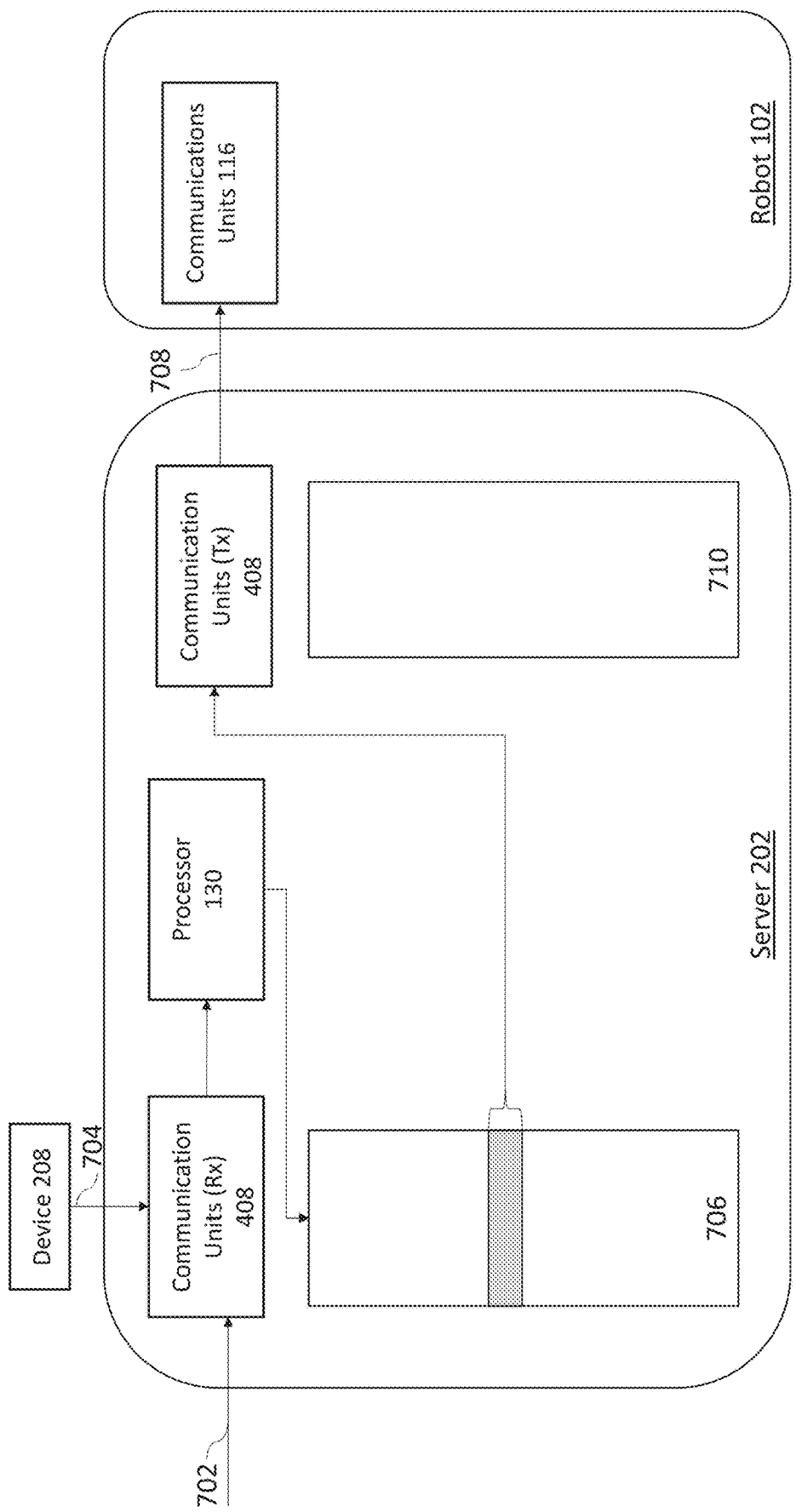
FIG. 7A-C are functional block diagrams illustrating a pull-based system for receiving binary data from a robot, according to exemplary embodiments.
Figure 7B:
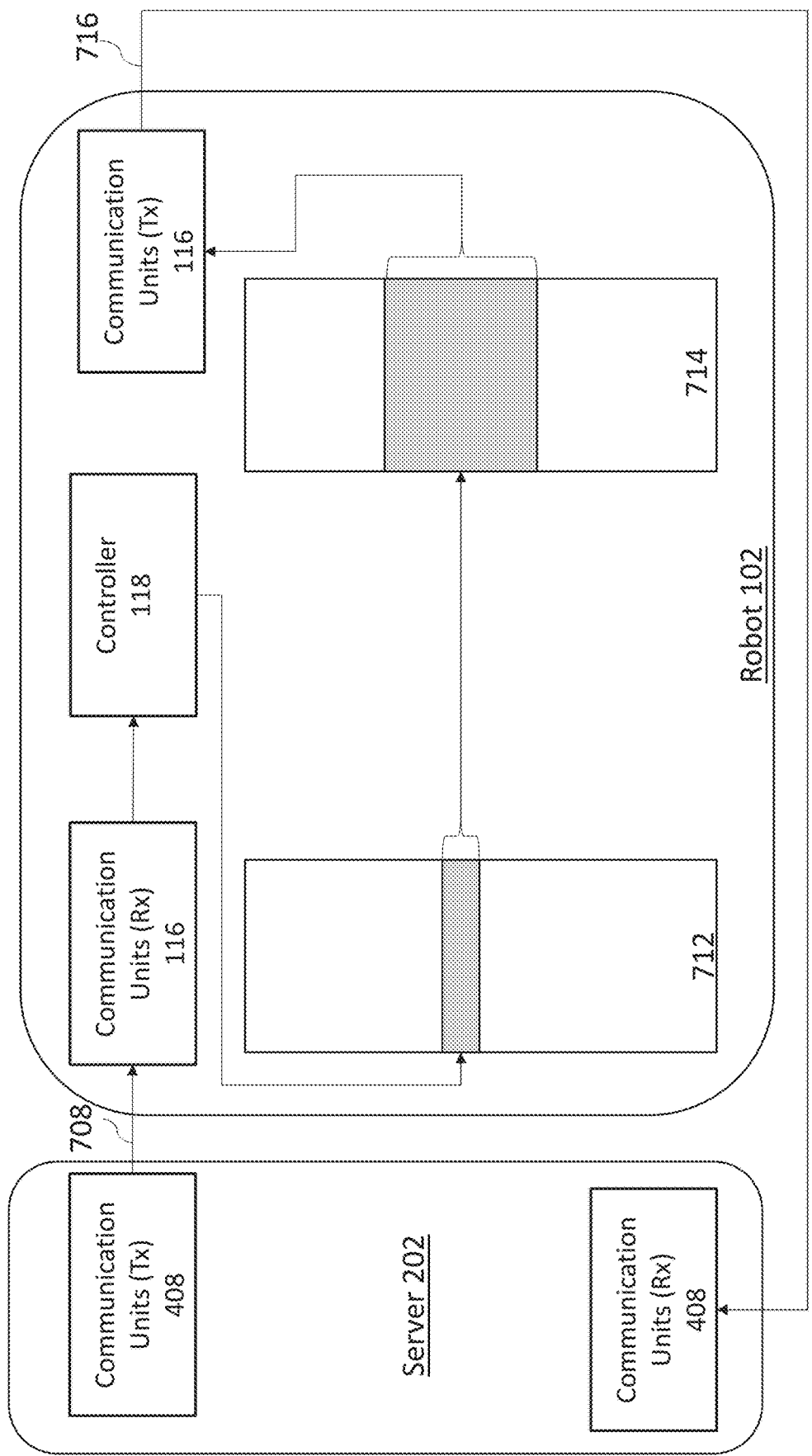
Figure 7C:
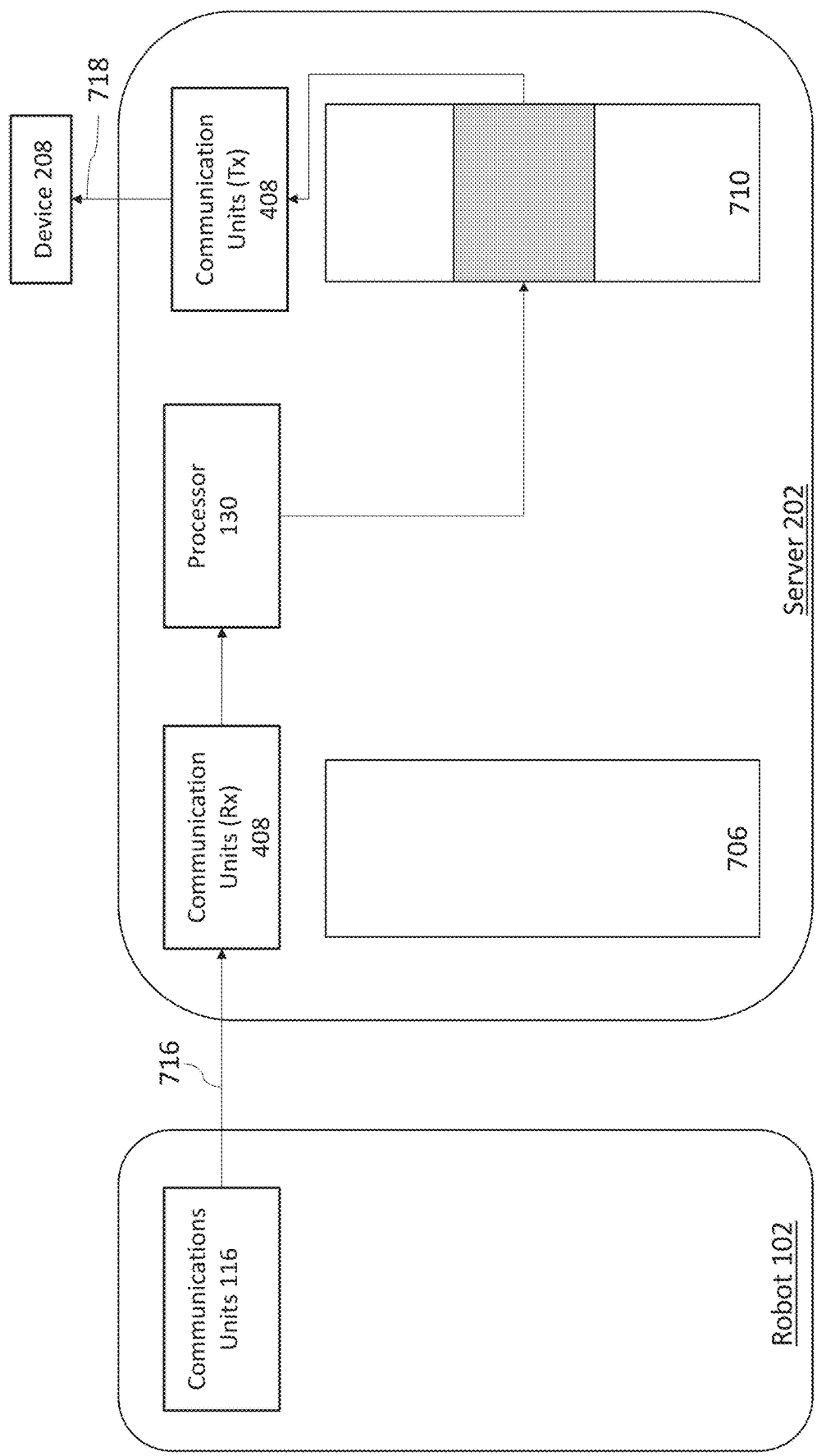

FIGS. 7A-C are functional block diagrams illustrating the methods 500, 600 of FIG. 5-6 above for communications between a robot 102 and a server 202, according to an exemplary embodiment. Starting with FIG. 7A, the server 202 receives upload of metadata via communications 702 from a robot 102. Communications 702 may comprise transmission of metadata associated with binary data collected by the robot 102 (e.g., metadata for sensor readings, computer readable maps, performances/behaviors of the robot 102, summaries, etc.). Such communications 702 of metadata corresponds to block 606 in method 600 illustrated above. Communications units 408, illustrated above in FIG. 4, may include a receiver ("Rx") and a transmitter ("Tx") component illustrated separately for clarity. The receiver may be configured to receive the communications 702 via a wired or wireless communications channel and transmitter may be configured to send communications to the robot 102.

So long as the robot 102 is operating (i.e., is not powered off or idle) and coupled to a network, such as an LTE or Wi-Fi network, communications 702 is substantially continuous, wherein the controller 118 of the robot 102 continuously uploads the metadata as binary data is collected and produced. It is appreciated by one skilled in the art that metadata is substantially smaller than its binary data counterpart; for example, a timestamp of an image may include a few bytes of information, whereas the image itself may include hundreds/thousands of bytes. Accordingly, the continuous upload of metadata 702 comprises a negligible usage of network bandwidth while providing information to the server 202 as to what events the robot 102 is experiencing.

Receiver may be further configured to receive a query 704 from a device 208 and/or host 204 of the server 202. As described in FIG. 5, the query 704 may correspond to an operator request, via a device 208, for binary data collected by the robot 102. The binary data may be useful for, as an example, diagnosing problems with a robot 102, such as studying a scenario which causes the robot 102 to cease autonomous operation (i.e., an assist event) using a video feed, sensory data, computer readable maps, actuator commands, and the like. The query 704 may be in the form of a request for data associated with a specific event, time and/or type of event, or a plurality of events. The processor 130 of the server 202 may receive the query 704 and parse metadata stored in memory 706 to identify metadata that matches the query request. Memory 706 may be illustrative of a portion of memory 404, shown in FIG. 4 above, which stores all metadata uploaded to the server from robots 102 coupled thereto. Memory 404 may further include a portion 710, illustrated separately from portion 706 for clarity, configured to store uploaded binary data. If the processor 130 determines that a metadata counterpart to the binary data requested by the query 704 is stored in memory 706, as shown by a grey highlighted portion in memory 706, the processor 130 may configure the transmitter to emit a signal 708 to the robot 102. The signal 708 causes the controller 118 of the robot 102 to mark, in memory 120, the requested binary data for upload to the server 202, as will be shown next in FIG. 7B. Stated differently, processor 130 of the server 202 determines that binary data collected by a robot 102 and requested by a query 704 is stored on the robot 102 memory 120 based on the existence of the metadata counterpart stored in memory 706 and previously uploaded to the server 202.

In some instances, the metadata stored in memory 706 and associated with a requested element of binary data may include a TTL, wherein the processor 130 verifies that the TTL of the binary data on the robot 102 has not expired. The TTL may denote a length of time for any element of binary or metadata stored on memory 120 of the robot 102, wherein the binary and metadata are deleted from memory 120 of the robot 102 upon the TTL expiring. If the TTL has expired (i.e., the requested binary data has been deleted) the processor 130 of server 202 may respond accordingly (e.g., "data has been deleted from robot memory").

In some embodiments, the robot 102 may call the server 202 and check if the server 202 has any metadata marked. The marked metadata may be indicated by communications 708, which is sent in response to the call. Such call may be utilized by the server 202 and robot 102 to ensure that a connection over a network (e.g., Wi-Fi or cellular) is established prior to any transmission of data. The controller 118 of the robot 102 may utilize the indicated metadata to determine binary data to be uploaded to the server 202. That is, communications 708 may be issued as a response to a robot 102 asking (i.e., calling) if there is a request for binary data from the server 202 (block 606 of FIG. 6).

By way of an illustrative example, a robot 102 may comprise a floor cleaning robot configured to clean floors of an environment. An operator of the robot 102 may input a query 704 comprising a request for a computer readable map of the environment produced by the controller 118 of the robot 102 during execution of a cleaning route. The query 704 may include a request for floor-space covered (i.e., cleaned) during the execution of the route to be shown on the map. The processor 130, in handling the query 704, may parse memory 706 to verify that (i) the route was executed (e.g., via detection of a route ID, execution timestamp, and/or other metadata), and (ii) a map was created (e.g., via detection of a timestamp stored in memory 706), and subsequently issue communications 708 to request an upload of the map. In some embodiments, the controller 118 of the robot 102 may calculate the floor space covered, illustrate the covered floor space on the map, and upload the map which includes the covered floor space (i.e., as a summary). In other embodiments, a map including the route may be uploaded to the server, wherein processor 130 may include the cleaned floor space using the size and/or shape of the robot 102 and the route information.

FIG. 7B illustrates a robot 102 receiving communications 708, according to an exemplary embodiment. Communications 708 may be received by a receiver ("Rx") component of communications units 116 configured to receive wired/wireless signals from the server 202. Communications units 116 may further include a transmitter ("Tx") component configured to send wired/wireless signals from the robot 102 to the server 202. The two components of communications units 116 are illustrated as two separate functional blocks for clarity but are not intended to be limited to two separate operative units and/or devices.

Controller 118 may process the communications 708 to determine what binary data to upload to the server 202 in order to satisfy the query 704 received by the server 202. The memory 120 of the robot 102 is illustrated in two parts: a metadata storage 712 and a binary data storage 714. The two parts of memory 120 may include separate sections (i.e., address ranges) in a single computer readable memory device (e.g., one hard drive) or two separate computer readable memory devices (e.g., two or more hard drives). Metadata storage 712 may store all metadata associated with binary data collected by sensor units 114 and/or produced by controller 118 during operation of the robot 102, the binary data being stored in portion 714 of the available memory.

The query 704 may request at least a portion of binary data stored in memory 714 associated with metadata stored in memory 712. The communications 708 issued in response to the query 704 may, upon receipt, cause the controller 118 to (i) determine that the binary data associated with the metadata of the query 704 still exists in memory 714, and (ii) upload the binary data if it still exists to the server 202. One skilled in the art may appreciate that a robot 102 may include a finite and limited amount of storage space in memory 120. Accordingly, it may not be possible for a robot 102 to store all binary data collected/produced in memory 120. Further, it is not practical to upload all the binary data to the server 202 as a substantial majority of the binary data is not useful other than for short term robot operations, such as navigating a route. For example, LiDAR measurements collected during execution of a route where no assist event occurs may not be of substantial use for the robot 102 and/or human operators beyond the execution of the route. Accordingly, all binary data collected by the robot 102 may include a time to live ("TTL") in memory 120. The TTL may correspond to metadata he binary data and metadata counterparts are deleted upon the TTL expiring. It is appreciated, however, that the metadata counterpart to the deleted binary data may still be stored in memory 404 of server 202. In some instances, the TTL may correspond to a time, such as minutes, hours, days, etc. In other embodiments, the TTL may include a threshold, wherein, upon the binary data stored in memory 120 reaching a threshold amount, the binary data is deleted. In some embodiments, the TTL may include a lifetime (in time units) and a memory threshold, wherein reaching the lifetime or memory threshold causes the binary data to be deleted.

The controller 118 may verify that the requested binary data exists in memory 714 upon receipt of the communications 708 by parsing metadata memory 712. Specifically, controller 118 may verify that the TTL (metadata) for the requested binary data has not expired by parsing memory 712. If the requested binary data includes an expired TTL, the controller 118 may utilize communications units 116 to communicate with the server 202 to indicate that the requested binary data no longer exists. Alternatively, processors 130 of the server 202 may verify if the TTL has expired based on metadata stored in memory 706 and reply to the query that the binary data has been deleted. For example, the query 704 may include a request for image data collected during a time window around an assist event. If the TTL has expired for the bundle of information, then the bundle of information to the server data does not comprise the binary data of which the corresponding TTL has expired. If the TTL has not expired, controller 118 parses a section memory 712 (shown in grey) comprising the metadata corresponding to the binary data requested by the query/ server 202. The highlighted portion of memory 712 may contain metadata (e.g., timestamps, device ID's, etc.) which corresponds to the desired binary data stored in memory 714, also highlighted in grey. The binary data counterpart to the metadata is shown using a larger highlighted portion to illustrate that the binary data is significantly larger than the metadata counterpart. The controller 118 may mark all binary data requested by communications 708 for upload. The marked binary data may then be communicated to the transceiver unit 718 and subsequently communicated to the server 202 via wired/wireless communications 716, provided the robot 102 is coupled to a network.

In some instances, the controller 118 may receive communications 708, mark the requested binary data for upload to server 202, and subsequently lose connection to a network such that the binary data is either not uploaded or only uploaded in part. Accordingly, controller 118 may retain any marked binary data in memory 714 even if the TTL expires. Marked binary data corresponds to binary data requested by communications 708.

FIG. 7C returns to the server 202 where the receiver 706 receives the communications 716 comprising the binary data requested by communications 708, according to an exemplary embodiment. Processor 130 may receive the binary data from communications 716 and store the binary data in memory 710. Memory 710 may be illustrative of a portion of memory 404 separate from memory 706 and/or a different computer readable storage medium. Subsequent to the storage of the binary data in memory 710, the processor 130 may cause the transmitter component of communications units 408 to emit signal 718 in response to the query 704. Signal 718 may be received by the device 208 which provided the query 704 (FIG. 7A) and/or other devices 208 coupled to the server 202. In some instances, the query 704 may require the server 202 to aggregate binary data from a plurality of robots 102, wherein signal 718 may be communicated to the device 208 upon the server 202 acquiring sufficient binary data to respond to the query 704.

In some instances, additional processing of the binary data may be required to respond to a query 704. The additional processing may be executed by processor 130 or by controller 118 prior to transmission of communications 716. Such processed data may include extracting information from maps, extracting information from images (e.g., identifying features), compression, filtering, preparing summaries as described above, and/or other operations. For example, controller 118, using motion planning algorithms embodied in instructions stored in memory 120, may simulate or recreate an event, such as an assist event, based on binary data stored in the memory 120 to calculate its path, identify any obstructions along the path, calculate distance traveled, and the like (e.g., a summary), wherein the controller 118 may upload a computer readable map. The computer readable map may include a plurality of images or a video feed which illustrates the world as perceived by the robot 102 over time which may be of use to operators of the robot 102. In other instances, the additional processing performed may be complex, such as identifying features using neural networks, wherein it is advantageous for processor 130 of the server 202 to execute additional processes which robots 102 do not usually perform to reduce computational load imposed on controllers 118 of the robots 102. It is appreciated that the binary data stored on server 202, specifically in memory 710, includes only data requested by operators of the robot 102.

In some embodiments, additional processing may be executed by a processor at the level of server 202, if the amount of processing desired requires processing capability that is not supported by the controller of the robot 102. For example, additional processing at the server level may comprise aggregating binary data from a plurality of individual robots 102 operating in a network 210 into a single report to provide a response to a query 704.

In some embodiments, query 704 may be an occasional or ad hoc request from a user requesting binary data for a specific time or event, such as an assist event. In some embodiments, query 704 may be a standing or recurring request that is processed by the robot 102 and server 202. For example, a recurring query 704 may be a request for a summary report from a robot 102 at the end of each autonomous run reporting its activities, such as floor areas cleaned (e.g., if robot 102 is a floor-cleaning robot), payloads delivered, time to execute its assigned tasks, and the like. If the run is determined to be uneventful by a user or a processor at the server level, the binary data and metadata generated during the run can be deleted from robot memory 120 and optionally sever memory or assigned a shorter TTL. If the run is determined to have an unanticipated event, even if it is not an assist event requiring human intervention, an exception report may be requested wherein binary data is uploaded to the server for further analysis by a user. In the case of exception reports, all binary and metadata associated with a run generating an exception report may be held in the robot memory 120 for further analysis. In other words, the TTL of binary data and associated metadata may be revised to an indefinite hold until cleared by a user. According to at least one non-limiting exemplary embodiment, data may not be removed from the robot 102 despite a TTL expiring if the robot 102 has not verified that the server 202 has requested the data, such as, for example, if the robot 102 is not connected to a network.

Advantageously, network usage by communications 702 (metadata) and 720 (requested binary data) is minimized, which substantially lowers costs for operating robots 102 on LTE networks and/or reduces bandwidth occupied by robots 102 operating on local Wi-Fi networks. The systems and methods discussed above enable pull-based robotic telemetry which enables operators of robots 102 to pull only necessary data from the robots 102 when required while accounting for hardware limitations of the robot 102, such as the limited/finite capacity of memory 120, and utilizing advantages of an external server 202, wherein increasing the memory capacity of a server 202 is substantially faster, easier, and more cost effective than performing the same for a robot 102 or a plurality of robots 102. When scaled up to thousands of robots 102 coupled to a server 202, minimizing network bandwidth, especially for robots 102 using LTE networks, is critical for economically supporting thousands of robots 102. Supporting robots 102 may include reviewing assist events, diagnosing problems, and/or improving robot 102 functionality, all of which may require analysis and/or processing of binary data collected by the robots 102.

Figure 8:
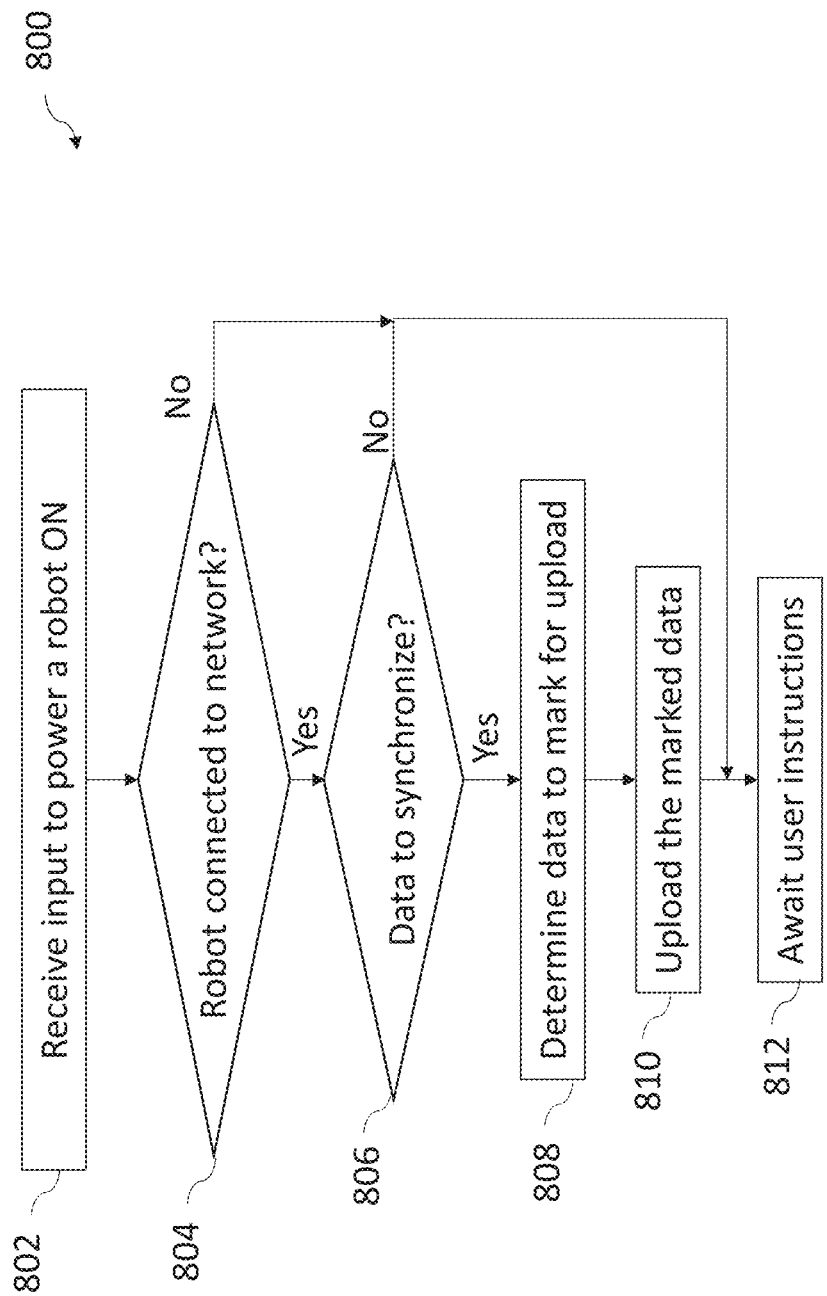
FIG. 8 is a process flow diagram illustrating a method for powering ON a robot in accordance with embodiments of this disclosure.

FIG. 8 is a process flow diagram illustrating a method 800 for a controller 118 of a robot 102 to power the robot 102 ON in accordance with the systems and methods of this disclosure.

Block 802 includes the robot 102 receiving an input to be powered ON. The input may comprise of a human operator pressing a button, turning a switch, inserting a key, entering a PIN code, and/or other methods of powering the robot 102 ON from an idle (i.e., unpowered) state.

Block 804 includes the controller 118 determining if the robot 102 is connected to a Wi-Fi or LTE network with a server 202. The controller 118 may further ensure the connection is stable and of sufficient bandwidth to facilitate data transmission.

Block 806 includes the controller 118 determining if there is data to synchronize with the server. The data to be synchronized in block 806 may include both metadata and binary data. For instance, the robot 102 may have been shut down by the operator prior to the controller 118 completing method 600 and uploading the necessary binary and metadata. In some instances, the robot 102 may complete its tasks while not connected to a network and be subsequently powered OFF before uploading.

To determine if data should be synchronized, the controller 118 may issue a communication to the server 202 to indicate it has been powered ON. The controller 118 may further specify the most recent event of which metadata was uploaded to the server 202 and receive the same from the server 202 (i.e., the most recent event stored on the server 202). If the robot 102 was shut down before completing an upload, there would be more events stored on the robot 102 than the server 202 is aware of (i.e., by the existence of metadata), thus indicating the robot 102 should upload metadata of these events to the server 202.

In some instances, other robots 102 may influence the behavior of the robot 102. For example, a second robot 102 may complete a route and upload binary data including an updated computer readable map of its environment. Upon the server 202 receiving communication that the first robot 102 has been powered ON, the server 202 may synchronize the binary data of the computer readable map to provide the first robot 102 with up-to-date maps of its environment.

Lastly, if a query 406 was input to the server 202 while the robot 102 was powered off or not connected to the network, the query may be communicated and handled following method 600 above once the robot 102 indicates to the server 202 that it is powered on and connected to a network.

Upon the controller 118 determining there is no data to be synchronized, the controller 118 moves to block 812 to await user instructions to perform a task.

Upon the controller 118 determining there is data to be synchronized, the controller 118 moves to block 808.

Block 808 includes the controller 118 marking the data identified by the server 202 for upload (e.g., in response to a query or to synchronize events between the server and robot).

Block 810 includes the controller 118 uploading the marked data. Blocks 808-810 are separated as the robot 102 may be commanded to perform a task by a user or be disconnected from the network, wherein the marked data may be uploaded at any time when the robot 102 is connected to the network following method 600.

Block 812 includes the robot 102 awaiting user instructions to perform a task. In some embodiments, blocks 808-812, as well as execution of the task itself, may be performed in parallel.

It will be recognized that, while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" or the abbreviation "e.g." is used to provide exemplary instances of the item in discussion, not an exhaustive or limiting list thereof, and should be interpreted as "example, but without limitation"; the term "illustration" is used to provide illustrative instances of the item in discussion, not an exhaustive or limiting list thereof, and should be interpreted as "illustration, but without limitation." Adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A robotic system, comprising:
   a non-transitory computer readable storage medium comprising a plurality of computer readable instructions stored thereon; and
   at least one controller configured to execute the computer readable instructions to:
   issue first communications to a server, the first communications comprising metadata associated with binary data generated by the at least one controller and sensors coupled to the robotic system, the first communications comprises a continuous transmission of the metadata as the sensors and controller produce the binary data and associated metadata, the metadata includes at least in part a timestamp corresponding to the production of the respective binary data;
   issue second communications to a server, the second communications comprising the at least one controller requesting if any binary data is to be uploaded to the server, wherein the server identifies the binary data to be uploaded based in part on receipt of the first communications; and
   issue third communications to the server, the third communications comprising a bundle of information, the bundle of information corresponds to binary data requested by the server in response to the server receiving the second communications.

2. The robotic system of claim 1, wherein,
   the server requests the binary data in response to a query input by an operator of the robotic system, the query indicates the binary data included in the bundle of information to be transmitted in the third communications, the binary data included in the bundle of information is selected by the server by marking the corresponding metadata based, at least in part, on the respective timestamps.

3. The robotic system of claim 1, wherein,
   the first, second and third communications are issued using cellular LTE (long term evolution) networks or Wi-Fi networks.

4. The robotic system of claim 1, wherein,
   the bundle of information communicated comprises one or more of data from the sensors coupled to the robotic system, a computer readable map produced by the at least one controller, or actuator commands issued by the at least one controller.

5. The robotic system of claim 4, wherein,
   the bundle of information includes binary data generated about a time window about an assist event.

6. The robotic system of claim 1, wherein the at least one controller is further configured to execute the computer readable instructions to,
   assign a time to live ("TTL") to each element of binary data; and
   delete the binary data upon expiration of the TTL,
   wherein, the bundle of information does not include any binary data of which the corresponding TTL has expired.

7. The robotic system of claim 1, wherein,
   the first communications further comprises summary information corresponding to performance summaries of the robotic system.

8. A system, comprising:
   a non-transitory computer readable storage medium comprising a plurality of computer readable instructions stored thereon; and
   at least one processor configured to execute the computer readable instructions to: receive first communications from one or more robots, the first
   communications comprising metadata associated with binary data generated by the one or more robots, the first communications comprises a continuous transmission of the metadata as the sensors and controller produce the binary data and associated metadata, the metadata includes at least in part a timestamp corresponding to the production of the respective binary data;
   receive a query from a device coupled to the at least one processor, the query corresponding to a request for the binary data collected by at least one robot of the one or more robots, wherein the server identifies the binary data to be uploaded based in part on receipt of the first communications;
   transmit a signal to the at least one robot, the signal corresponding to a request for the binary data; and
   receive the binary data from the at least one robot in response to the transmitted signal.

9. The system of claim 8, wherein the network includes one of a cellular LTE network or Wi-Fi network.

10. The system of claim 8, wherein the at least one processor is further configured to execute the computer readable instructions to:
    classify an assist event based on the received binary data, the classification comprises at least one of a path blockage, a collision, a near collision, software failure, or hardware failure,
    wherein, the assist event corresponds to the at least one robot ceasing autonomous operation based at least on the at least one robot encountering one of the classes of events.

11. A method for operating a robot, comprising:
    issuing, via at least one controller of the robot, first communications to a server, the first communications comprising metadata associated with binary data generated by the at least one controller and sensors coupled to the robot, the first communications comprises a continuous transmission of the metadata as the sensors and controller produce the binary data and associated metadata, the metadata includes at least in part a timestamp corresponding to the production of the respective binary data;
    issuing, via the at least one controller of the robot, second communications to the server, the second communications comprising the at least one controller requesting if the binary data is to be uploaded to the server, the server identifies the binary data to be uploaded based in part on receipt of the first communications; and
    issuing third communications to the server, the third communications comprising a bundle of information, the bundle of information corresponds to the binary data requested by the server in response to the server receiving the second communications.

12. The claim 11, wherein, the server requests the binary data in response to a query input by an operator of the robot, the query indicates the binary data included in the bundle of information to be transmitted in the third communications, the binary data included in the bundle of information is selected by the server by marking the corresponding metadata based, at least in part, on the respective timestamps.

13. The method of claim 11, wherein, the first, second and third communications are effectuated using cellular LTE networks or Wi-Fi networks.

14. The method of claim 11, wherein,
the bundle of information communicated via the third communications comprises one or more of data from the sensor coupled to the robot, a computer readable map produced by the at least one controller, or actuator commands issued by the at least one controller of the robot.

15. The method of claim 14, wherein, the bundle of information comprises the binary data generated about a time window about an assist event.

16. The method of claim 11, further comprising:
assigning, via the at least one controller of the robot, a time to live ("TTL") to each element of the binary data; and
deleting, via the at least one controller of the robot, the binary data upon expiration of the TTL,
wherein the bundle of information does not comprise the binary data of which the corresponding TTL has expired.

17. The method of claim 11, wherein, the first communications further comprises summary information corresponding to performance summaries of the robot.

18. A non-transitory computer readable storage medium comprising a plurality of computer readable instructions embodied thereon which, when executed by at least one controller of a robot, cause the at least one controller to:
issue first communications to a server, the first communications comprising metadata associated with binary data generated by the at least one controller and sensors coupled to the robot, the first communications comprises a continuous transmission of the metadata as the sensors and controller produce the binary data and associated metadata, the metadata includes at least in part a timestamp corresponding to the production of the respective binary data;
issue second communications to the server, the second communications comprising the at least one controller requesting if the binary data is to be uploaded to the server the server identifies the binary data to be uploaded based in part on receipt of the first communications;
issue third communications to the server, the third communications comprising a bundle of information, the bundle of information corresponds to binary data requested by the server in response to the server receiving the second communications;
wherein,
the server requests the binary data in response to a query input by an operator of the robot, the query indicates the binary data included in the bundle of information to be transmitted in the third communications, the binary data included in the bundle of information is selected by the server by marking the corresponding metadata based, at least in part, on the respective timestamps;
the first, second and third communications are effectuated using cellular LTE networks or Wi-Fi networks;
the bundle of information communicated via the third communications comprises one or more of data from the sensor coupled to the robot, a computer readable map produced by the at least one controller, or actuator commands issued;
the bundle of information comprises the binary data generated about a time window about an assist event; and
the first communications further comprises summary information corresponding to performance summaries of the robot.

\* \* \* \* \*

UNITED STATES PATENT AND TRADEMARK OFFICE
CERTIFICATE OF CORRECTION

| | | |
|---|---|---|
| PATENT NO. | : 11,825,342 B2 | Page 1 of 2 |
| APPLICATION NO. | : 17/465326 | |
| DATED | : November 21, 2023 | |
| INVENTOR(S) | : Keith Chester and Daniel Sackinger | |

It is certified that error appears in the above-identified patent and that said Letters Patent is hereby corrected as shown below:

In the Claims

1. In Column 33, Lines 18-19, change "at least one controller configured to execute the computer readable instructions to" to --at least one controller configured to execute computer readable instructions to--.
2. In Column 33, Lines 26-28, change "the metadata includes at least in part a timestamp corresponding to the production of the respective binary data" to --the metadata includes at least in part a timestamp corresponding to production of the binary data--.
3. In Column 33, Lines 43-44, change "the query indicates the binary data" to --the query input indicates the binary data--.
4. In Column 33, Lines 46-49, change "the binary data included in the bundle of information is selected by the server by marking the corresponding metadata based, at least in part, on the respective timestamps" to --the binary data included in the bundle of information is selected by the server by marking the metadata based, at least in part, on the timestamp--.
5. In Column 34, Lines 13-14, change "at least one processor configured to execute the computer readable instructions to" to --at least one processor configured to execute computer readable instructions to--.
6. In Column 34, Lines 18-24, change "the first communications comprises a continuous transmission of the metadata as the sensors and controller produce the binary data and associated metadata, the metadata includes at least in part a timestamp corresponding to the production of the respective binary data" to --the first communications comprises a continuous transmission of the metadata as sensors and controller produce the binary data and associated metadata, the metadata includes at least in part a timestamp corresponding to production of the binary data--.
7. In Column 34, Line 33-34, change "receive the binary data from the at least one robot in response to the transmitted signal" to --receive the binary data from the at least one robot in response to the signal--.
8. In Column 34, Line 35-36, change "wherein the network includes one of a cellular LTE network or Wi-Fi network" to --further comprising a network including one of a cellular LTE network or Wi-Fi network--.
9. In Column 34, Line 40, change "classify an assist event based on the received binary data" to Signed and Sealed this
Fourth Day of March, 2025

Coke Morgan Stewart
*Acting Director of the United States Patent and Trademark Office*

CERTIFICATE OF CORRECTION (continued)
U.S. Pat. No. 11,825,342 B2

--classify an assist event based on the binary data--.

10. In Column 34, Lines 56-58, change "the metadata includes at least in part a timestamp corresponding to the production of the respective binary data" to --the metadata includes at least in part a timestamp corresponding to production of the binary data--.

11. In Column 35, Lines 3-9, change "The claim 11, wherein, the server requests the binary data in response to a query input by an operator of the robot, the query indicates the binary data included in the bundle of information to be transmitted in the third communications, the binary data included in the bundle of information is selected by the server by marking the corresponding metadata based, at least in part, on the respective timestamps" to --The method of claim 11, wherein, the server requests the binary data in response to a query input by an operator of the robot, the query input indicates the binary data included in the bundle of information to be transmitted in the third communications, the binary data included in the bundle of information is selected by the server by marking the metadata based, at least in part, on the timestamp--.

12. In Column 35, Line 15-16, change "one or more of data from the sensor coupled to the robot" to --one or more of data from the sensors coupled to the robot--.

13. In Column 35, Lines 29-31, change "wherein the bundle of information does not comprise the binary data of which the corresponding TTL has expired" to --wherein the bundle of information does not comprise the binary data of which the TTL has expired--.

14. In Column 36, Lines 4-6, change "the metadata includes at least in part a timestamp corresponding to the production of the respective binary data" to --the metadata includes at least in part a timestamp corresponding to production of the binary data--.

15. In Column 36, Lines 23-26, change "the binary data included in the bundle of information is selected by the server by marking the corresponding metadata based, at least in part, on the respective timestamps" to --the binary data included in the bundle of information is selected by the server by marking the metadata based, at least in part, on the timestamp--.

16. In Column 36, Line 30-32, change "the bundle of information communicated via the third communications comprises one or more of data from the sensor coupled to the robot" to --the bundle of information communicated via the third communications comprises one or more of data from a sensor coupled to the robot--.